(12) United States Patent
Sadeghi et al.

(10) Patent No.: US 11,843,451 B2
(45) Date of Patent: *Dec. 12, 2023

(54) RESOURCE ALLOCATION IN COMMUNICATIONS NETWORKS USING PROBABILITY FORECASTS

(71) Applicant: INVIDI Technologies Corporation, Princeton, NJ (US)

(72) Inventors: Samira Sadeghi, Edmonton (CA); Ivan Mizera, Edmonton (CA); David Ballantyne, Edmonton (CA); Daniel C. Wilson, Edmonton (CA)

(73) Assignee: INVIDI Technologies Corporation, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,089

(22) Filed: Feb. 14, 2023

(65) Prior Publication Data
US 2023/0291486 A1     Sep. 14, 2023

Related U.S. Application Data

(63) Continuation of application No. 17/167,954, filed on Feb. 4, 2021, now Pat. No. 11,581,968, which is a
(Continued)

(51) Int. Cl.
*H04L 69/329* (2022.01)
*H04H 20/42* (2008.01)
(Continued)

(52) U.S. Cl.
CPC .......... *H04H 20/423* (2013.01); *H04H 20/42* (2013.01); *H04H 20/74* (2013.01);
(Continued)

(58) Field of Classification Search
CPC ....... H04L 20/423; H04L 20/74; H04L 29/06; H04L 21/2385; H04L 21/26208; H04H 20/74; H04H 20/78
(Continued)

(56) References Cited

U.S. PATENT DOCUMENTS

| | | | |
|---|---|---|---|
| 6,735,630 B1 * | 5/2004 | Gelvin | B60R 25/33 709/200 |
| 6,789,123 B2 | 9/2004 | Li | |

(Continued)

FOREIGN PATENT DOCUMENTS

| | | |
|---|---|---|
| AU | 2004310448 A1 | 6/2006 |
| CN | 102137088 A * | 7/2011 |
| WO | 2014122372 A1 | 8/2014 |

*Primary Examiner* — Khanh Q Dinh
(74) *Attorney, Agent, or Firm* — Davis Graham & Stubbs LLP

(57) ABSTRACT

A system (1000) is disclosed including a resource allocation optimization (RAO) platform (1002) for optimizing the allocation of resources in network (1004) for delivery of assets to user equipment devices (UEDs) (1012). The RAO platform (1002) determines probabilities that certain asset delivery opportunities (ADOs) will occur within a selected time window and uses these probabilities together with information concerning values of asset delivery to determine an optimal use of asset deliveries. In this regard, the RAO platform (1004) received historical data from repository (1014) that facilitates calculation of probabilities that ADOs will occur. Such information may be compiled based on asset delivery records for similar network environments in the recent past or over time.

22 Claims, 11 Drawing Sheets

Related U.S. Application Data continuation of application No. 16/517,406, filed on Jul. 19, 2019, now Pat. No. 10,951,335, which is a continuation of application No. 15/833,647, filed on Dec. 6, 2017, now Pat. No. 10,404,390.

(60) Provisional application No. 62/430,725, filed on Dec. 6, 2016.

(51) Int. Cl.

| | | |
|---|---|---|
| *H04N 21/234* | (2011.01) | |
| *H04N 21/262* | (2011.01) | |
| *H04N 21/61* | (2011.01) | |
| *H04N 21/81* | (2011.01) | |
| *H04H 20/74* | (2008.01) | |
| *H04H 20/78* | (2008.01) | |
| *H04H 60/06* | (2008.01) | |
| *H04L 9/40* | (2022.01) | |
| *H04N 21/2385* | (2011.01) | |

(52) U.S. Cl.
CPC ............ *H04H 20/78* (2013.01); *H04H 60/06* (2013.01); *H04L 9/40* (2022.05); *H04N 21/2385* (2013.01); *H04N 21/23424* (2013.01); *H04N 21/26208* (2013.01); *H04N 21/6112* (2013.01); *H04N 21/812* (2013.01); *H04L 69/329* (2013.01)

(58) Field of Classification Search
USPC ................................ 709/220, 224, 226, 228
See application file for complete search history.

(56) References Cited

U.S. PATENT DOCUMENTS

| | | | |
|---|---|---|---|
| 6,826,123 B1 | 11/2004 | Herring | |
| 6,826,607 B1* | 11/2004 | Gelvin | G01V 1/22 709/224 |
| 6,832,251 B1* | 12/2004 | Gelvin | G01V 1/22 709/224 |
| 6,859,831 B1* | 2/2005 | Gelvin | H04L 12/2805 709/224 |
| 7,403,993 B2 | 7/2008 | John et al. | |
| 7,546,619 B2 | 6/2009 | Anderson | |
| 7,624,125 B2 | 11/2009 | Feinsmith | |
| 7,729,984 B1 | 6/2010 | Nappi | |
| 7,890,301 B2 | 2/2011 | Warrior | |
| 8,108,895 B2 | 1/2012 | Anderson et al. | |
| 8,850,473 B2 | 9/2014 | Sheehan et al. | |
| 8,856,473 B2 | 10/2014 | Van Riel | |
| 8,924,269 B1 | 12/2014 | Seubert | |
| 9,154,824 B2 | 10/2015 | Wiser et al. | |
| 9,270,733 B2 | 2/2016 | Ruppert et al. | |
| 9,278,284 B2 | 3/2016 | Ruppert et al. | |
| 9,396,475 B2 | 7/2016 | Cristofalo et al. | |
| 9,922,381 B2 | 3/2018 | Isaacson | |
| 9,930,373 B2* | 3/2018 | Zucchetta | H04N 21/25816 |
| 10,002,396 B2 | 6/2018 | Isaacson | |
| 10,075,754 B2 | 9/2018 | Sheehan et al. | |
| 10,205,736 B2 | 2/2019 | Rieki | |
| 10,404,390 B2 | 9/2019 | Sadeghi et al. | |
| 10,511,580 B2 | 12/2019 | Isaacson | |
| 10,621,653 B2 | 4/2020 | Isaacson | |
| 10,643,266 B2 | 5/2020 | Isaacson | |
| 10,666,673 B2 | 5/2020 | Rieke et al. | |
| 10,666,904 B2 | 5/2020 | Anderson et al. | |
| 10,791,348 B2 | 9/2020 | Roth et al. | |
| 10,832,310 B2 | 11/2020 | Isaacson | |
| 10,951,335 B2 | 3/2021 | Sadeghi et al. | |
| 11,049,207 B1 | 6/2021 | Weldon et al. | |
| 11,581,968 B2* | 2/2023 | Sadeghi | H04N 21/812 |
| 2004/0148625 A1 | 7/2004 | Eldering et al. | |
| 2005/0080869 A1 | 4/2005 | Bender | |
| 2005/0081080 A1 | 4/2005 | Bender | |
| 2006/0287915 A1 | 12/2006 | Boulet et al. | |
| 2016/0094312 A1* | 3/2016 | Fredriksson | H04L 1/0041 714/807 |
| 2017/0070880 A1* | 3/2017 | Hahn | H04W 12/02 |
| 2018/0019984 A1 | 1/2018 | Isaacson | |
| 2018/0199079 A1 | 7/2018 | Wilson et al. | |
| 2019/0007381 A1* | 1/2019 | Isaacson | G06Q 20/12 |
| 2019/0036957 A1* | 1/2019 | Smith | H04L 9/3239 |
| 2019/0222595 A1* | 7/2019 | Giani | G06F 18/295 |
| 2019/0230070 A1* | 7/2019 | Isaacson | H04W 12/084 |

* cited by examiner

RESOURCE ALLOCATION IN COMMUNICATIONS NETWORKS USING PROBABILITY FORECASTS

CROSS REFERENCE TO RELATED APPLICATION

This application is a continuation of U.S. patent application Ser. No. 17/167,954, entitled, "RESOURCE ALLOCATION IN COMMUNICATIONS NETWORKS USING PROBABILITY FORECASTS," filed Feb. 4, 2021, which is a continuation of U.S. patent application Ser. No. 16/517,406, entitled, "RESOURCE ALLOCATION IN COMMUNICATIONS NETWORKS USING PROBABILITY FORECASTS," filed Jul. 19, 2019, which is a continuation of U.S. patent application Ser. No. 15/833,647, entitled, "RESOURCE ALLOCATION IN COMMUNICATIONS NETWORKS USING PROBABILITY FORECASTS," filed Dec. 6, 2017, which claims priority to U.S. Provisional Application No. 62/430,725, entitled, "RESOURCE ALLOCATION IN COMMUNICATIONS NETWORKS USING PROBABILITY FORECASTS," filed on Dec. 6, 2016. The contents of the above-noted applications are incorporated herein by reference as if set forth in full and priority to these applications are claimed to the full extent allowable under U.S. law and regulations.

FIELD OF THE INVENTION

The present invention relates generally to allocating resources in a communications network and, in particular, to allocating asset delivery resources where those resources may be insufficient to support delivery of all desired assets with respect to all asset delivery opportunities of the network.

BACKGROUND

Communications networks generally have limited resources available for delivering assets such as advertising, public service announcements or other content. In some cases, due to these limitations, it may be necessary or practical to favor some asset delivery opportunities (ADOs) but not others. Which ADOs are supported in such cases may be based on an analysis of the resources and ADOs, on an opportunistic basis (e.g., "first come-first served"), or some other basis. Allocation of resources based on an analysis of the resources and ADOs is generally preferable, provided that sufficient information is available concerning the resources, the ADOs, and some system of valuation for the ADOs. Unfortunately, the information that is available at the time that decisions concerning asset allocation are made is sometimes incomplete or inaccurate.

Those difficulties can be illustrated by considering the example of allocating assets to support targeted or addressable advertising in a broadcast network such as a broadcast television network. In such contexts, limited resources, such as dedicated in-band resources or dedicated asset channels, may be available for delivery of addressable assets. The addressable assets may be substituted for a default asset to better match assets to targeted audience segments. For example, a user equipment device (e.g., a set top box or television) may be controlled to switch to a selected asset channel during a given break of a programming channel to deliver an asset matched to the current user (e.g., viewer) or users. It will be appreciated that there are generally practical limitations on the bandwidth that is available to provide addressable assets. As a result, there may not be sufficient resources available to support all possible ADOs as defined in relation to the programming channels and/or audience segments that could be supported. For example, in a given network, it may be anticipated that potentially overlapping ADOs (e.g., advertising spots) may occur on each of four programming channels during a time window being managed. Further, it may be desired to deliver ten addressable assets in connection with those potentially overlapping ADOs. In this case, if resources are only available to support delivery of six assets to support the ADOs, it is apparent that not all possible assets can be delivered if the ADOs in fact overlap.

Resource allocation is further complicated in certain contexts due to the nature of the assets and the uncertainty concerning when ADOs will occur. Considering again the case of broadcast television networks, the entity/system making decisions regarding resource allocation may not know when a commercial break (generally including one or more asset spots) is going to occur until shortly before the break. Moreover, it is generally unacceptable to interrupt an asset after it has begun, and an asset may typically last for 15 seconds to a minute or more. Consequently, a decision may need to be made concerning resource allocation for a first ADO of a time window (e.g. a time segment being managed for resource allocation purposes) before the total number of ADOs occurring at least in part in the time window is known.

SUMMARY OF THE INVENTION

In accordance with the present invention, asset delivery resources can be allocated in a communications network based on intelligent predictions and associated valuations concerning ADOs. Specifically, a resource allocation process may be executed for a time window under consideration. Different size time windows can be employed depending on the nature of the network and the desired management granularity or processing limitations. In the case of broadcast television environments, practical time windows may vary, for example, from relatively coarse time windows on the order of one minute to fine time windows that may be a small fraction of a minute. The time windows may be static windows or can be dynamically defined, for example, to optimize performance in relation to size or value of audience for targeted asset delivery.

The allocation process further involves determining a set of asset delivery resources for consideration. The asset delivery resources are the resources available in the communications network for delivery of assets and can vary depending on the network environment, the size of the time window, and other factors. For example, in the case of a satellite or cable television network, there may be a limited number of sidebar or asset channels, or a limited amount of other bandwidth, available for transmitting assets. In certain streaming contexts, such as multicast streaming for mobile TV, carriers may have bandwidth constraints. It will be appreciated that the asset delivery resources, and units for considering the same, may be different in different network contexts.

A set of resource allocation units is also selected for consideration. The resource allocation units are the units that are considered in relation to resource allocation at a given step in the process. Generally, the resource allocation determination will proceed iteratively with respect to successive units. For example, in the case of a television network having a number of programming channels that have addressable ADOs (e.g., ad spots), and a number (that may vary over time) of asset channels used to provide asset options for the addressable spots, the resource allocation units may include particular programming channels. In other cases, the process may iterate with respect to successive time units.

Probabilities may be calculated concerning the likelihood of an ADO (e.g., an addressable ADO) occurring with regard to each resource allocation unit. In the case where the resource allocation units are individual programming channels, probabilities may be calculated concerning the likelihood that an ADO will occur for each programming channel during a time window (e.g., at least a portion of said ADO overlaps a portion of the time window). It is noted that each of the resource allocation units may have one or more potential ADOs for the time window, e.g., one or more ad spots or one or more audience segments for an ad spot. In this regard, it will be appreciated that only a limited number of content delivery bands (e.g., programming channels) or ADOs (e.g., designated addressable ADOs) may be considered for purposes of resource allocation. In the case of multicast network contexts, e.g., for mobile TV, the resource allocation units may be time intervals and probabilities may be calculated concerning individual streaming or download events where each event defines one or more ADOs. The process may thus involve determining probabilities concerning the likelihood that such events will occur during a time window.

For each of the resource allocation units under consideration, the process further involves calculating a value for delivery of an asset in connection with the ADO. For example, the value may be determined in relation to an estimated audience size or composition, estimated revenues, or other valuation parameter related to delivery of the asset. A set of probabilities and values is thereby generated for the corresponding ADOs.

Based on the set of probabilities and values, the asset delivery resources can be allocated with respect to specific ADOs of specific ones of the asset allocation units. This allocation may result in withholding use of available resources to support an earlier ensuing ADO so that resources will be available for a later ensuing ADO, e.g., because the later ensuing ADO is determined to be statistically preferable due to the probability of the ADO occurring during the window and the estimated value of delivery of an asset in connection with the later ADO.

The resource allocation process may be implemented by a computer-based platform configured with appropriate logic, e.g., software, firmware and/or hardware. The platform can communicate with associated information systems to access information concerning the content delivery bands to be supported, the asset delivery resources available for the time window, historical information concerning ADOs of the content delivery bands, audience size and composition information, delivery values, and the like.

BRIEF DESCRIPTION OF THE DRAWINGS

For a more complete understanding of the present invention, and further advantageous thereof, reference is now made to the following detailed description, taken in conjunction with the drawings, in which.

DETAILED DESCRIPTION

The present invention relates to allocating limited resources available for servicing ADOs in a communications network. This may encompass a variety of different types of ADOs in a variety of network environments. In the following description, a number of network contexts where the invention may be employed are first described in Section 1. Thereafter, certain resource allocation optimization techniques are described in Section 2.

1. Network Contexts

The present invention is useful in a variety of networks including cable television networks, satellite television networks, streaming networks, and hybrid networks. Each of these examples briefly discussed below together with a description of resource constraints that can be addressed by the resource allocation optimization functionality of the present invention. While these examples facilitate understanding of the subsequent description of the resource allocation optimization system and functionality, it will be appreciated that similar resource limitations exist in other network contexts and the invention is not limited to these networks or contexts.

1.1 Cable Television Networks

Figure 1:
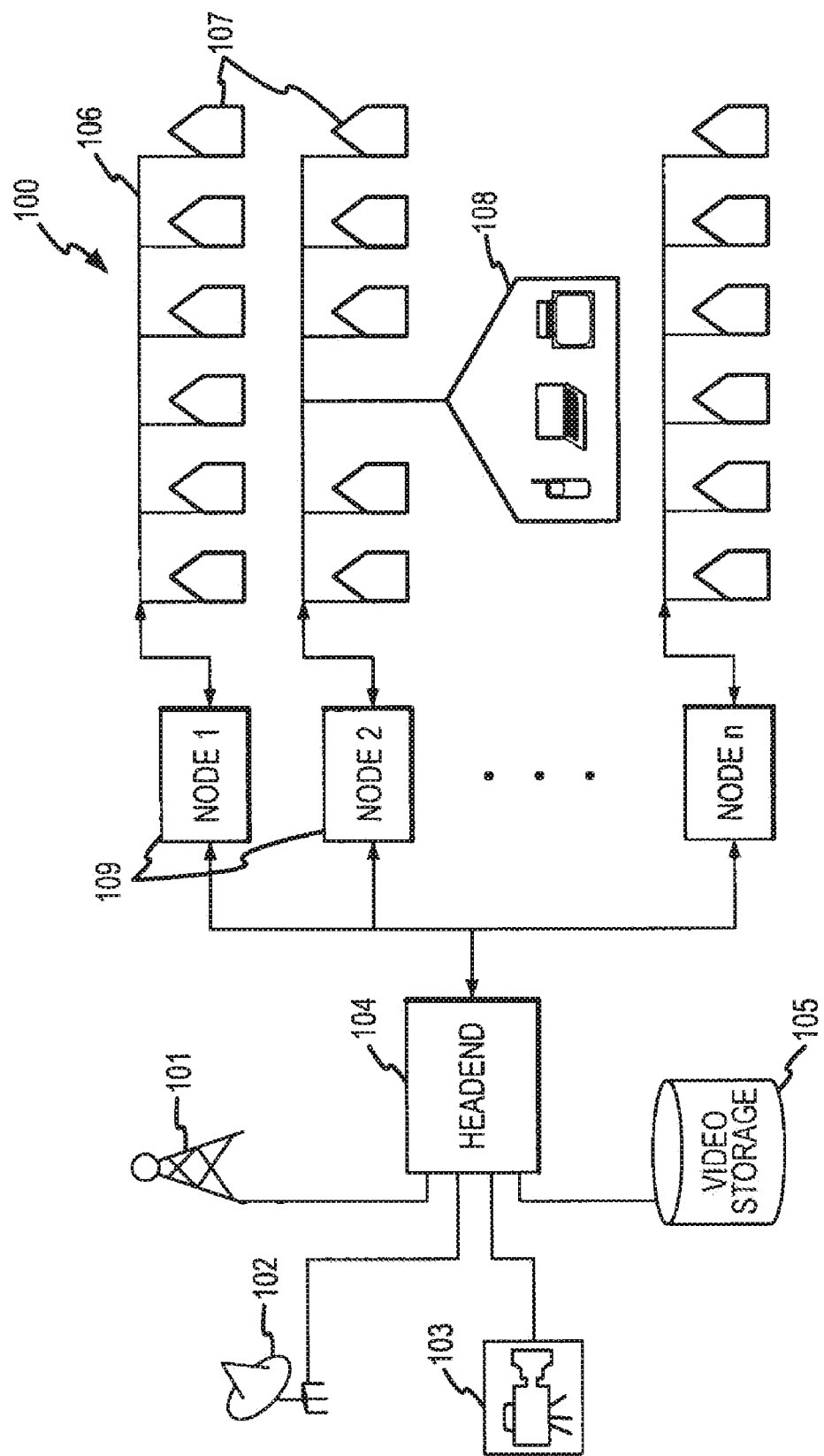
FIG. 1 is a schematic diagram of a cable television network in connection with which the invention may be implemented.

For purposes of illustration, the invention is described in some instances below in the context of a cable television network implementation. Some major components of a cable television network 100 are depicted in FIG. 1. In the illustrated network 100, a headend 104 obtains broadcast content from any of a number of sources 101-103. Additionally, broadcast content may be obtained from storage media 105 such as via a video server. The illustrated sources include an antenna 101, for example, for receiving content via the airwaves, a satellite dish 102 for receiving content via satellite communications, and a fiber link 103 for receiving content directly from studios or other content sources. It will be appreciated that the illustrated sources 101-103 and 105 are provided for purposes of illustration and other sources may be utilized.

The headend 104 processes the received content for transmission to network users, e.g., residential or business users. Among other things, the headend 104 may be operative to amplify, convert, format and otherwise process the broadcast content signals as well as to combine the signals for insertion into a common cable for transmission to network users 107 (although graphically depicted as households, as described below, the system of the present invention can be used in implementations where individual users in a household or business users are targeted). It also is not necessary that the target audience be composed of households or household members in any sense. For example, the present invention can be used to create on-the-fly customized presentations to students in distributed classrooms, e.g., thus providing examples which are more relevant to each student or group of students within a presentation being broadcast to a wide range of students. The headend also processes signals from users in a variety of contexts as described below. The headend 104 may thus be thought of as the control center or local control center of the cable television network 100.

Typically, there is not a direct fiber link from the headend 104 to the user equipment device (UED) 108. Rather, this connection generally involves a system of feeder cables and drop cables that define a number of system subsections or branches. This distribution network may include a number of nodes 109. The signal may be processed at these nodes 109 to insert localized content, filter the locally available channels or otherwise control the content delivered to users in the node area. The resulting content within a node area is typically distributed by optical and/or coaxial links 106 to the premises of particular users 107. Finally, the broadcast signal is processed by the UED 108 which may include a television, data terminal, a digital set top box, DVR or other terminal equipment. It will be appreciated that digital or analog signals may be involved in this regard. In addition, while a cable network is shown, cable television content may also be delivered via wireless or data network devices such as phones, tablets, laptops or the like.

Network operators derive revenue, based on delivery of desirable content or programming. The stakeholders in this regard include programming providers, asset providers such as advertisers (who may be the same as or different than the programming providers), network operators and users—or viewers in the case of television networks.

Programming providers include, for example: networks who provide series and other programming, including on a national or international basis; local affiliates who often provide local or regional programming; studios who create and market content including movies, documentaries and the like; and a variety of other content owners or providers.

Asset providers include a wide variety of manufacturers, retailers, service providers and public interest groups interested in, and generally willing to pay for, the opportunity to deliver messages to users on a local, regional, national or international level. As discussed below, such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. In addition, the networks may use spots for internal marketing as discussed above, and the spots may be used for public service announcements or other non-advertising content.

Network operators operate the networks used to deliver content and associated assets (though the content and assets may be delivered via different networks or paths in some cases). Examples of network operators include multichannel video programming distributors (MVPDs), internet service providers and other network service providers. Such operators are generally responsible for delivering content to users and otherwise operating the networks as well as for contracting with the networks and asset providers and billing.

Users are the end consumers of the content. Users may employ a variety of types of UEDs including television, set top boxes, tablets, phones, data terminals, satellite delivered video or audio to an automobile, appliances (such as refrigerators) with built-in televisions, etc.

As described below, all of these stakeholders have an interest in improved delivery of content including targeted asset delivery. For example, users can thereby be exposed to assets that are more likely of interest and can continue to have the costs of programming subsidized or wholly borne by asset providers. Asset providers can benefit from more effective asset delivery and greater return on their investment. Network operators and asset providers can benefit from increased value of the network as an asset delivery mechanism and, thus, potentially enhanced revenues. The present invention addresses all of these interests. While targeted asset delivery is a particular challenge in relation to resource allocation for asset delivery, and is therefore an advantageous application of the present invention, the invention is not limited to targeted or addressable contexts.

It will be noted that it is sometimes unclear that the interests of all of these stakeholders are aligned. For example, it may not be obvious to all users that they benefit by consuming such assets. Indeed, some users may be willing to avoid consuming such assets even with an understanding of the associated costs. Network operators and asset providers may also disagree as to how programming should best be distributed, how asset delivery may be associated with the programming, and how revenues should be shared. As described below, the present invention provides a mechanism for accommodating potentially conflicting interests or for enhancing overall value such that the interests of all stakeholders can be advanced.

Assets can be provided via a variety of distribution modes including real-time broadcast distribution, forward-and-store, cloud-based decisioning, and on-demand delivery such as VOD and streaming. Real-time broadcast delivery involves synchronous delivery of assets to multiple users such as the conventional paradigm for broadcast radio or television (e.g., airwave, cable or satellite). The forward-and-store mode involves delivery of assets ahead of time to UEDs with substantial storage resources, e.g., a DVR or data terminal. The asset is stored for later display, for example, as prompted by the user or controlled according to logic resident at the UED and/or elsewhere in the communications network.

In cloud-based decisioning, decisions regarding asset delivery for particular UEDs are made remotely, e.g., at a cloud-based platform. Decisions are generally made just before an ADO. Assets may be delivered to the UED, for example, via a data network such as the internet and may be preloaded onto the UED or downloaded in response to decision. In such contexts, resource allocation may be required in relation to processing limitations of the cloud-based decisioning platform, bandwidth limitations of the asset delivery network, or other limitations. The on-demand mode involves individualized delivery of content from the network to a user, often on a pay-per-view basis. The present invention can be utilized in connection with any of these distribution modes or others. In this regard, important features of the present invention can be implemented using conventional UEDs without requiring substantial storage resources to enhance even real-time broadcast programming, for analog and digital users.

The amount of programming that can be delivered to users is limited by the available programming space. This, in turn, is a function of bandwidth. Thus, for example, cable television networks, satellite television networks, satellite radio networks, and other networks have certain bandwidth limitations. In certain broadcast networks, the available bandwidth may be divided into bandwidth portions that are used to transmit the programming for individual channels or stations. In addition, a portion of the available bandwidth may be utilized for bi-directional messaging, metadata transmissions and other network overhead. Alternately, such bi-directional communication may be accommodated by any appropriate communications channels, including the use of one or more separate communications networks. The noted bandwidth portions may be defined by dedicated segments, e.g., defined by frequency ranges, or may be dynamically configured, for example, in the case of packetized data networks. As will be described below, in certain implementations, the networks may use available (dedicated or opportunistically available) bandwidth for substantially real time transmission of assets, e.g., for targeted asset delivery with respect to a defined asset delivery spot. In these implementations, bi-directional communications may be accommodated by dedicated messaging bandwidth and by encoding messages within bandwidth used for asset delivery. A DOCSIS path or certain TELCO solutions using switched IP may be utilized for bi-directional communications between the headend and UEDs and asset delivery to the UEDs, including real-time asset delivery, in the systems described below.

The number of asset channels available for targeted asset delivery may be limited by the available bandwidth (e.g., unused channels) of a given network operator. Thus, the operator may have a number of dedicated asset delivery channels available for servicing addressable ADOs. These asset delivery channels may define a pool of channels that are shared by several programming channels that support addressable ADOs. Consequently, decisions may be made concerning what asset channel resources to use, e.g., which ADOs to support or how to otherwise apportion the asset channels. This is discussed in more detail in U.S. Pat. No. 8,108,895, which is incorporated by reference herein in full.

Figure 2A:
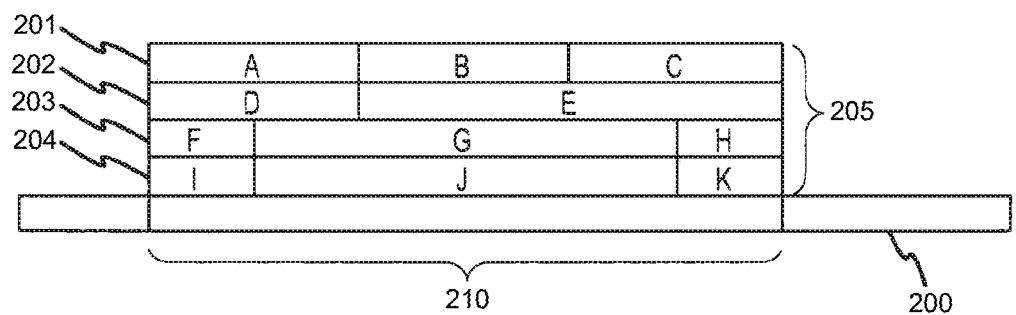
FIGS. 2A-2B illustrate asset channels of the network of FIG. 1, that may be allocated in accordance with the present invention and related programming channels.

As discussed below, the system may also make use of channels that are opportunistically available, e.g., channels that are used for VOD at night may be available to support asset options during the day, or unused bandwidth within a node filter area may be used for this purpose. FIG. 2A illustrates the use of four asset channels 201-204 for providing assets during a break 210 of a programming channel 200. As shown, on each asset channel 201-204, the break 210 may be separated into one or more asset spots that may have different durations. However, in the case of FIG. 2A, the start and end times of the asset sets A-C, D-E, F-H and I-K carried by the asset channels 201-204 are aligned with the start and end times of the break 210. Each of the asset channels 201-204 may carry an asset that is targeted to a specific audience classification of the users of the programming channel 200 or the users of additional programming channels having a break aligned with the break 210 of the programming channel 200.

Figure 2B:
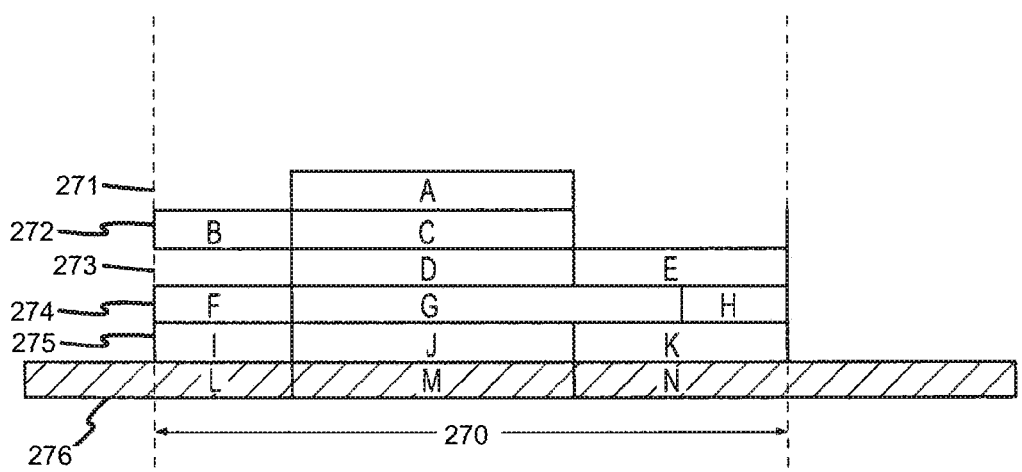

It should be noted that such asset flotillas need not be rectangular as shown in FIG. 2A. That is, due to conflicts between breaks or the intermittent availability of certain asset channels as discussed above, the total number of asset channels used to support a given programming channel may change during a break. This is illustrated in FIG. 2B. As shown, assets A-N are provided during a break 270 on asset channels 271-275 and the supported programming channel 276. In this case, channels 274 and 275 (as well as programming channel 276) provide assets throughout the break 270. Channel 273 does not provide assets until sometime after the break begins. Channel 272 provides assets from the beginning of the break, but ceases to provide assets prior to the end of the break 270. Channel 271 starts providing assets after the start of the break 270 and ceases providing assets prior to the end of the break 270. It will be appreciated that complex flotilla shapes may be implemented.

Referring again to FIG. 2A, each asset channel 201-204 includes a different combination of assets A-K that may be targeted to different viewers of the channel 200 during a given break 210. Collectively, the assets A-K carried by the asset channels 201-204 define a flotilla 205 that includes assets that may be targeted to different groups of users. The most appropriate assets for a given user may be on different ones of the channels 201-204 at different times during the break 210. These can be delivered to the user by channel hopping during the break with due consideration given to the fact that spots on different channels 201-204 may not have the same start and end times. How the various spots in the flotilla 205 are populated with assets is described in the previously referenced U.S. Pat. No. 8,108,895.

The four asset channels 201-204 may be utilized to provide multiple asset options for different programming channels. For instance referring to FIG. 3, programming channels 304 and 306 have temporally distinct breaks 312 and 316 that may include multiple ad spots. Accordingly, the system may provide a first four-channel asset flotilla having a first set of assets during the first break 312 for the first channel 304. Likewise a second four-channel asset flotilla having a second set of assets may be provided during the second break 316 for the second channel 306. In this regard, use of the bandwidth available for asset channels may be shared between programming channels 304 and 306. In cases where breaks overlap (e.g., breaks 314 and 316), one channel may be selected for addressable asset delivery, or, the available bandwidth for the asset channels may be split between the conflicting breaks. For example, each programming channel may be supported by a two-channel asset flotilla or one programming channel may be supported by three asset channels and the other programming channel supported by only one asset channel, for example, due to relative audience sizes or asset delivery values.

Figure 3:
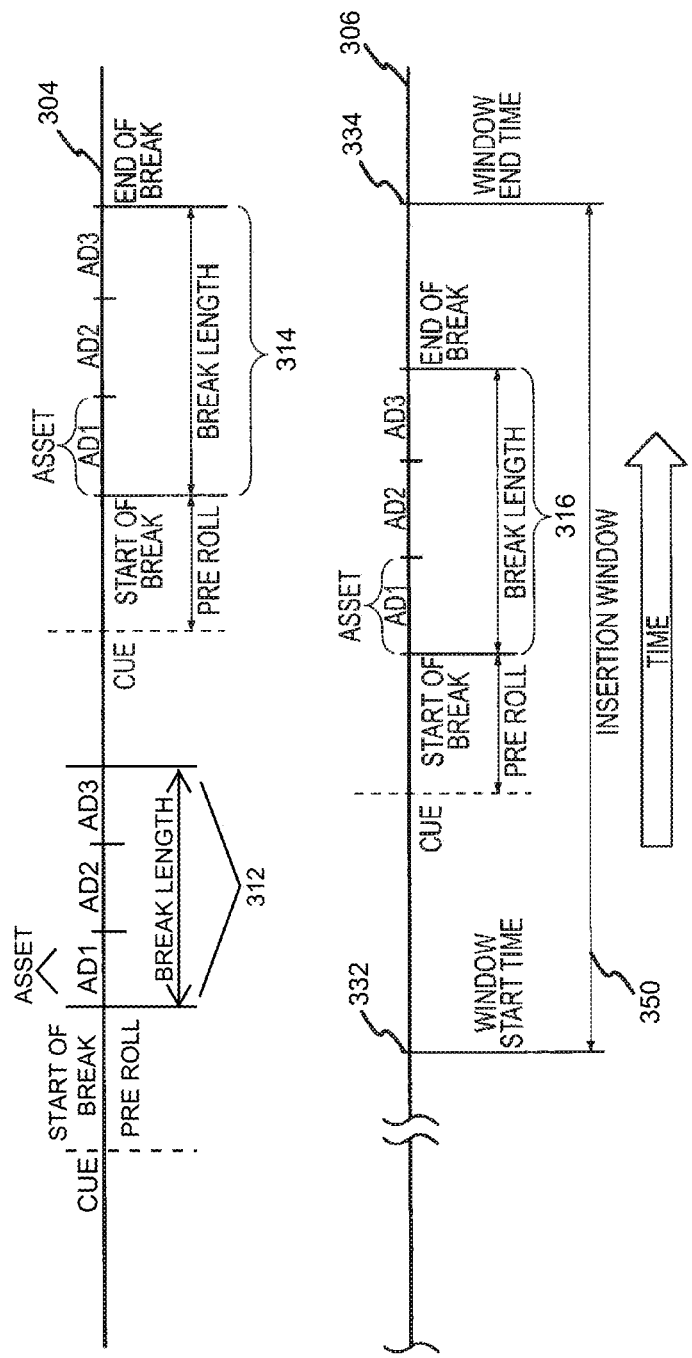
FIG. 3 illustrates ADOs, of the network of FIG. 1, that may be managed in accordance with the present invention.

Unfortunately, the exact time when an ADO will occur generally is not known ahead of time. For example, as shown in FIG. 3, rather than specify exact times when breaks will occur, networks generally schedule an avail or window 350 during which one or more breaks will occur. The illustrated window 350 extends from a start time 332 to an end time of 334 and, as shown, is much longer than the break 316. The exact time of the break 316 is not known until the start of the break 316 is indicated by a cue (e.g., a cue tone or cue message) just prior to the break 316. That is, the cue is separated from the start of the first ad spot in the break only by a very brief pre-roll. While historical data can be used to shorten the length of the window as set forth in U.S. Pat. No. 8,108,895, substantial uncertainty remains which complicates resource allocation.

It will be appreciated that the asset channels, in this scenario, present limited resources. It is important to allocate these resources in an optimal fashion. As described below, this involves consideration of which ADOs conflict or overlap and the values associated with such ADOs. Unfortunately, the timing of these ADOs is not known with precision ahead of time. The resource allocation optimization techniques described below address these concerns.

1.2 Satellite Television Networks

Figure 4:
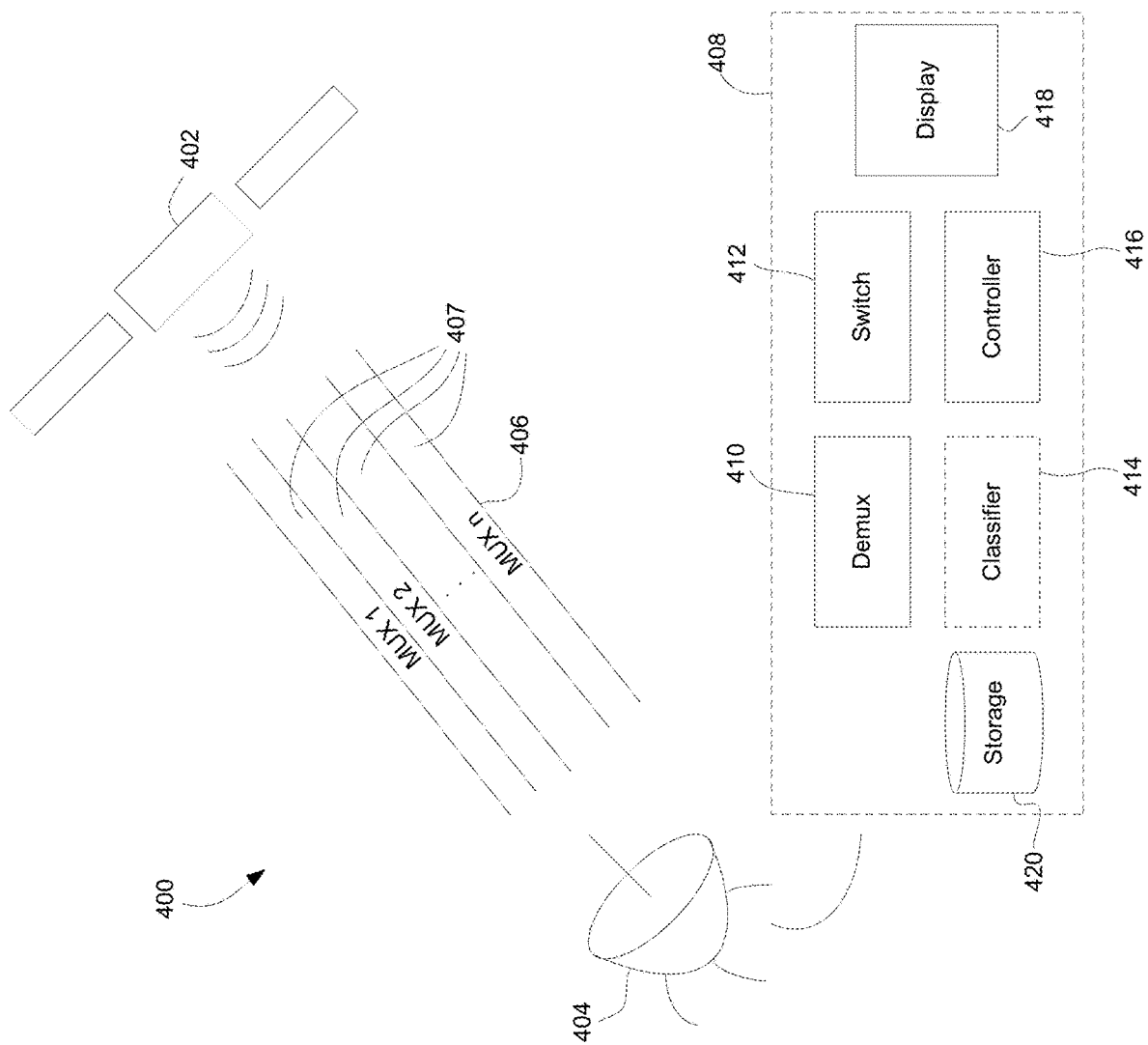
FIG. 4 is a schematic diagram of a satellite television network in connection with which the invention may be implemented.

The notion of resource limitations for assets and defined asset channels is not limited to cable television networks and may also occur, for example, in satellite networks. Referring to FIG. 4, a schematic diagram of a satellite network 400 is shown. The illustrated network 400 includes a satellite 402 that transmits a satellite transmission 406 to a terrestrial receiver 404, such as a satellite dish. The satellite dish 404 is associated with a UED 408 such as a television with a set top box. Although a single satellite 402, a single receiver 404 and a single UED 408 are shown, it will be understood that the network 400 will generally include multiple satellites 402, multiple receivers 404, and multiple UEDs 408. Moreover, in the network 400, there will not necessarily be a one-to-one correspondence of elements, e.g., a receiver 404 may be associated with multiple UEDs 408.

The illustrated satellite transmission 406 includes a number of MUXs 407. As will be understood from the description below, each of the MUXs 407 may include multiple content channels. Generally, the UED 408 can demultiplex the MUXs and tune to a particular channel within a particular MUX to display the associated content at the UED 408. The UED 408 can typically switch channels within a single MUX by re-tuning without implicating certain analog circuitry and with minimal latency between the command to change channels and execution of the associated channel hop. By contrast, hopping channels between different MUXs 407 takes significant and varying time, e.g., up to multiple seconds, and results in a generally unacceptable latency for purposes of channel hopping to deliver addressable assets. Thus, an important consideration relates to configuring the satellite transmission 406 such that asset options are included in the same MUX 407 as the corresponding programming channel. It will be appreciated in this regard that the desired effect can be achieved by providing the asset options in any bandwidth of the same MUX and references to asset channels are not intended to limit implementation to a specific bandwidth configuration within the MUX.

The illustrated UED 408 includes a display device 418 such as a television screen and a controller 416 for controlling delivery of content to be displayed. The controller 416 operates a number of components including, in the illustrated embodiment, a demultiplexer 410, a switch 412, storage 420 and an optional classifier 414 for determining or receiving audience classification information. The demultiplexer 410 obtains an electronic representation of the satellite transmission 406 from the receiver 404 and demultiplexes the transmission 406 to provide access to the channels within the transmission 406. In this regard, the processor 416 can process the demultiplexed signal to select or tune to a desired channel of the transmission 406.

Figure 5:
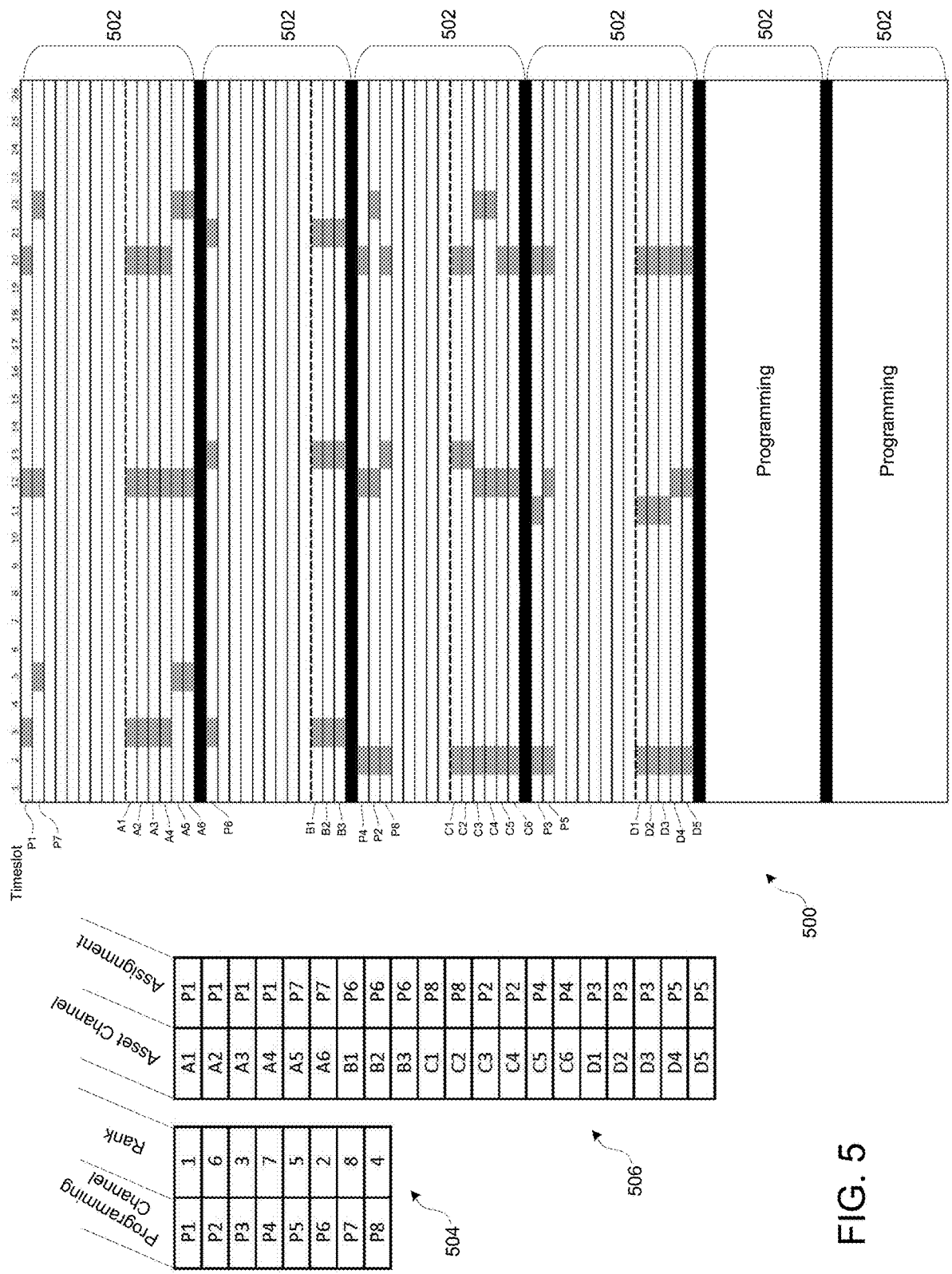
FIGS. 5-6 illustrate certain configurations of satellite transmissions, of the network of FIG. 4, that may be managed in accordance with the present invention.
Figure 6:
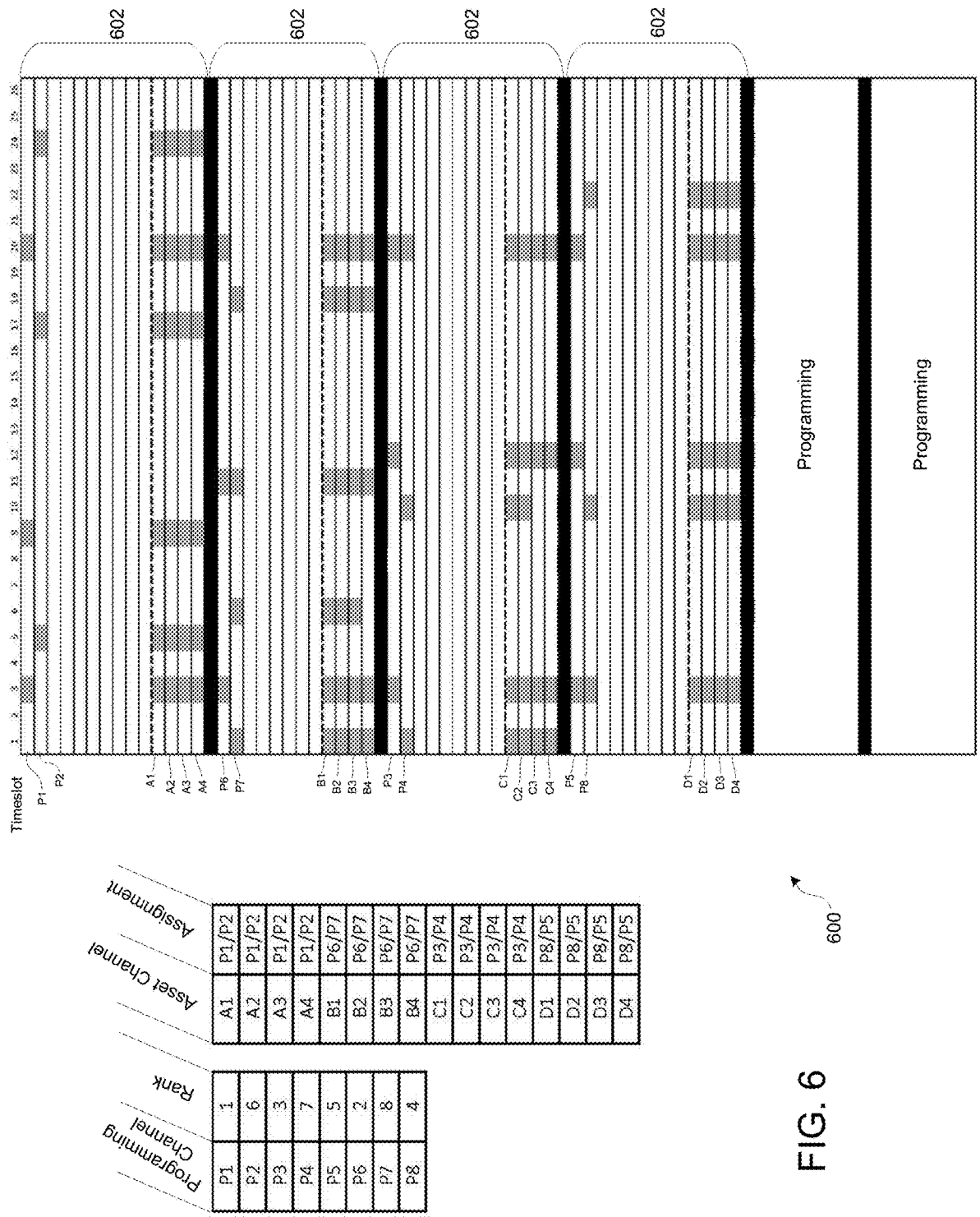

As noted above, the addressable asset delivery system may or may not make use of historical ADO data in determining how to configure a satellite transmission and insert content. FIGS. 5 and 6 illustrate alternative implementations in this regard. Referring first to FIG. 5, a process for configuring a satellite transmission without utilizing historical ADO data is illustrated. FIGS. 5 and 6 illustrate certain resource allocation processes that may be employed without using the resource allocation optimization functionality set forth in section 2 below. As shown, a satellite transmission 500 is depicted as including a number of MUXs 502. Each MUX 502 includes a number of content channels that may include programming channels and asset channels. It will not necessarily be the case that all MUXs 502 include both programming channels and asset channels. Thus, for purposes of illustration, in FIG. 5, the upper four MUXs 502 include both programming channels and asset channels whereas the bottom two MUXs 502 include only programming channels. It will be appreciated that this configuration is shown only for purposes of illustration and that an actual satellite transmission may have a different number of MUXs or a different arrangement of programming channels and asset channels. However, it is preferred that the asset channels provided to support a particular ADO of a particular programming channel will be in the same multiplex as the supported ADO.

In the illustrated implementation, the programming channels that include addressable ADOs are assigned to different MUXs 502 based at least in part on a rank. The rankings are shown in table 504. In this case, eight programming channels P1-P8 include addressable ADOs and those programming channels are ranked from 1 to 8 with 1 representing the highest and most valuable ranking. Thus, for example, a programming channel that has the highest ratings or highest potential value of addressable asset delivery for a time window under consideration may be ranked as the highest or most valuable programming channel. In this case, P1 is identified as having the highest rank designated as rank 1. On the other hand, P7 is identified as having the lowest rank.

Table 506 shows asset channel assignments. As noted above, it may be the case that only certain MUXs include asset channels. Moreover, as shown, different MUXs 502 may have a different number of asset channels available, for example, due to bandwidth and business considerations. In the illustrated example, the uppermost MUX 502 includes six asset channels A1-A6; the next MUX 502 includes three asset channels B1-B3; the next MUX 502 includes six asset channels C1-C6; and finally the next MUX 502 includes five asset channels D1-D5.

It may be the case that the highest value or highest rank programming channel should be supported by the most asset channels. Thus, for example, one or more asset providers may wish to provide addressable assets to different audience segments for an ADO associated with a large overall audience share and a network, affiliate or other owner of an ADO may wish to accommodate as many asset channels as possible. However, this will not necessarily be the case. For example, a single asset provider may purchase the entirety of a high value addressable ADO but only wish to place two asset options for that ADO, e.g., based on gender. In the illustrated example, it is assumed that it will generally be desired to provide more asset channels to support addressable ADOs on highly ranked programming channels. Accordingly, as shown in the table 506, the highest rank programming channel, P1, is supported by four asset channels, A1-A4, whereas the lowest rank programming channel, P7, is supported by only two asset channels, A5-A6.

Considerable analysis may be required to develop an optimal configuration of the satellite transmission 500 in this regard. For example, the analysis can be used to determine 1) whether all or only a subset of the programming channels including potentially addressable ADOs will be assigned asset channels, 2) whether more than one such programming channel will be included in one or more of the MUXs 502, 3) when more than one such programming channel will be included in one or more of the MUXs 502, which sets of two or more programming channels should share MUXs, and 4) when more than one such programming channel is included in one or more of the MUXs 502, how the asset channels of that MUX will be apportioned amongst the programming channels.

There are a number of ways that the process of configuring a satellite transmission can be coordinated with contracting for addressable asset delivery. For example, the satellite transmission may be configured prior to contracting with asset providers, e.g., based on historical ratings or pricing information, so that information can be provided to asset providers concerning the likely availability of asset channels for a given ADO. Alternatively, contracting with asset providers may be executed first and then the contract information may be utilized to execute transmission configuration. As a still further alternative, asset providers may contract to purchase a certain number of targeted impressions rather than purchasing specific segments of specific ADOs. In this manner, greater flexibility will be provided to configure satellite transmissions so as to efficiently fulfill campaign specifications.

In the implementation illustrated in FIG. 5, the asset channels are statically assigned to programming channels of the same MUX 502. This is advantageous in that that asset channels are guaranteed to be available when an addressable ADO occurs and supports certain contracting models. However, this will not necessarily make efficient use of the bandwidth associated with the asset channels. Thus, for example, at timeslot twelve of the uppermost MUX 502, each of the programming channels P1 and P7 includes an addressable ADO as indicated by shading and all of the asset channels A1-A6 are utilized during that timeslot. However, at, for example, timeslot three, only programming channel P1 includes an addressable ADO. That addressable ADO is only serviced by four asset channels A1-A4 even though it turns out that all six asset channels A1-A6 were available. It is thus apparent that more efficient use of the asset channels could be achieved if the occurrence of addressable ADOs on different asset channels could be reliably predicted. It should be appreciated that the timeslots are shown for convenience of illustration and ADOs will not necessarily align or not align in binary fashion, e.g., ADOs may partially overlap.

FIG. 6 illustrates an alternate implementation that may be utilized, for example, where historical information is used to identify programming networks that are likely or unlikely to have overlapping ADOs. In this case, the asset channels of each MUX 602 of the satellite transmission 600 can be dynamically assigned to the programming channels of that MUX 602. For example, programming channels P1 and P2 share asset channels A1-A4. Thus, when the addressable ADOs of a single MUX do not overlap, such as the ADO of programming channel P1 at timeslot three, all four of the asset channels A1-A4 can be used to support that ADO. However, where addressable ADOs do overlap, such as the ADOs of the programming channels P6 and P7 at timeslot eleven, the asset channels B1-B4 are shared or apportioned as between programming channels P6 and P7. In this regard, all or a majority of the asset channels B1-B4 may be assigned to the higher ranking programming channel, in this case P6, or the programming channels may be otherwise assigned. It should be noted that it is not necessarily the case that all asset channels will be used in connection with every ADO. For example, in timeslot six, only three asset channels B1-B3 are used to support the addressable ADO of programming channel P7. This may occur, for example, because only three audience segments were sold for that addressable ADO (or four segments if one segment is the default asset including in the programming channel P7).

The satellite transmission configuration process illustrated in FIG. 6 may be used, for example, in connection with implementations where the historical ADO data is utilized to minimize conflicts between addressable ADOs of the same MUX. For example, programming channels P1 and P2 may have been selected for inclusion in the same MUX 602 because historical data indicates that the addressable ADOs of programming channels P1 and P2 rarely coincide. Thus, the process of configuring the satellite transmission 600 involves not only the rank of the programming channels and/or valuations, but also the probability that ADOs will overlap. A processor can be configured to analyze various permutations of programming channel placements and asset channel apportionments to determine a configuration that has the highest value or otherwise satisfies configuration objectives.

However, apportionment of asset channels within a MUX will not necessarily correspond to such rankings. For example, a programming channel with a large overall audience or large potential value may get fewer asset channels than a lower ranked programming channel in the event of conflicting ADOs due to, for example, a lower number of asset options or lower value audience segments. This is described in more detail in U.S. patent application Ser. No. 15/403,847 which is incorporated by reference herein in full.

The discussion above suggests one sequence for satellite signal configuration. First, the number of MUXs in a satellite signal, the number of MUXs that will include asset channels, and the number of asset channels that are available in those MUXs may be determined. This may involve a variety of businesses and technology considerations of the network provider, programming networks, asset providers and other stakeholders. Some of these considerations may have little or nothing to do with addressable asset delivery. However, at least the number of MUXs including asset channels and the number of asset channels available in the various MUXs may be determined based on consideration of the demand for and potential value of addressable ADOs.

Next, the number of programming channels for which addressable ADOs will be supported, and the placement of these programming channels into the available MUXs may be determined. This may involve consideration of average or ADO specific viewership, average or per audience segment values, probability of conflicting ADOs, premiums paid for guaranteed access, etc. Finally, in the event of a conflict, asset channels may be shared or apportioned based on ranking, revenues or other considerations (e.g., priority of an asset provider or need to fulfill specifications of a campaign near expiration). Such appointment may be predetermined in anticipation of potential conflicts or determined at the time a conflict becomes apparent. Moreover, based on analysis of historical ADO data and asset values, asset channels that are available at the initiation of an ADO may be withheld to support an expected, potentially overlapping ADO. It will be appreciated that the resource allocation optimization functionality of Section 2 below can be used to configure the satellite transmission as well as to allocate the asset channels to ADOs.

1.3 Streaming Networks

Figure 7:
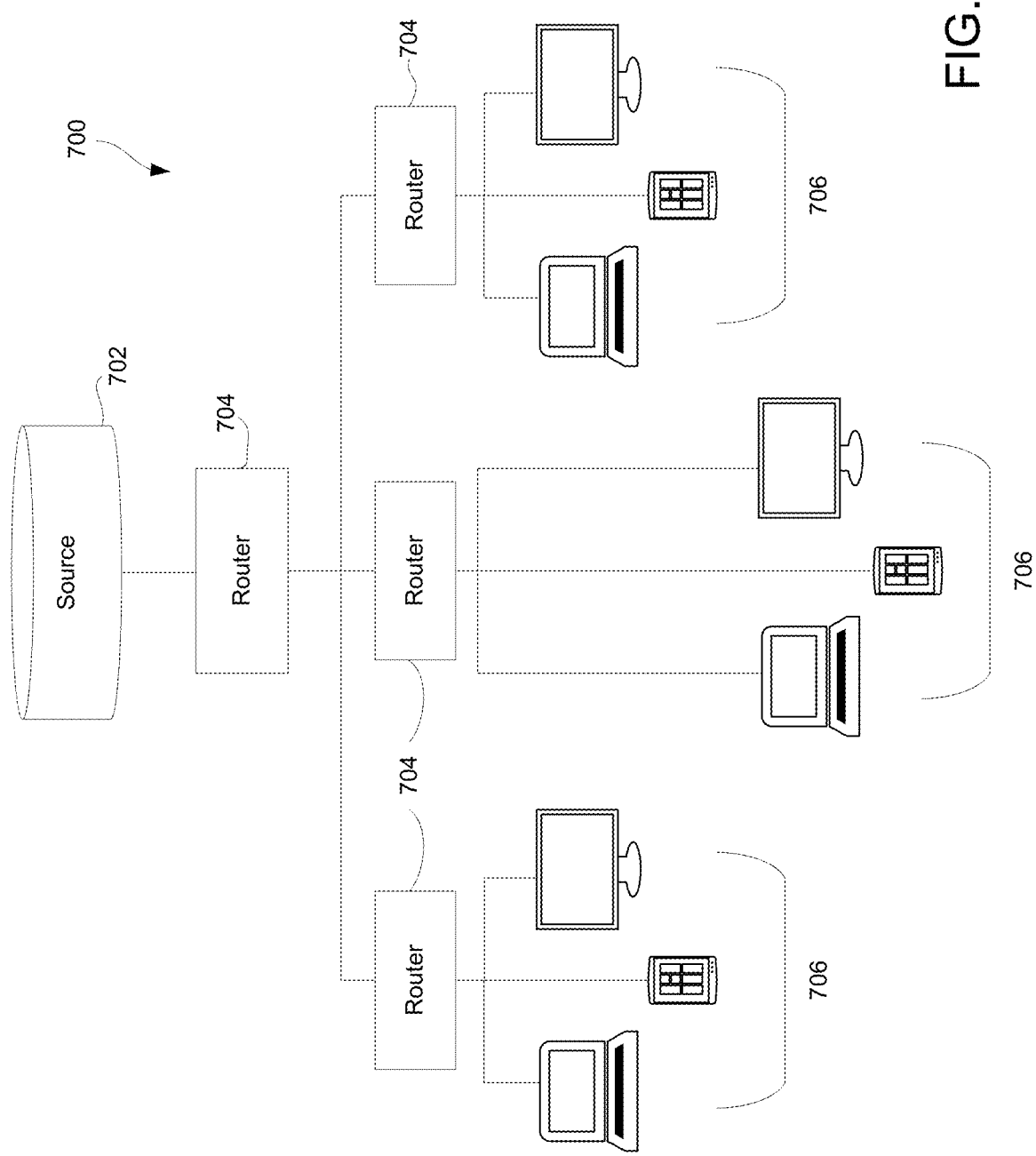
FIG. 7 is a schematic diagram of a streaming network in connection with which the invention may be implemented.

The resource allocation optimization functionality described below is not limited to broadcast networks (e.g., television or radio), but is also applicable to multimedia streaming networks where content is inserted into and transmitted via data and/or wireless networks. An example of this is mobile TV networks 700 as shown in FIG. 7. Though various transmission protocols may be utilized in this regard, the network 700 is described in relation to multicast implementations.

The illustrated network includes a content source 702 and a number of routers 704 for routing content from the source 702 to UEDs 706. The illustrated source 702 provides streaming content such as mobile TV content. For example, a network operator may provide on-demand or scheduled programming to subscribers. Accordingly, the source 702 may comprise a set of servers or cloud-based resources that can access live or stored content and format the content for transmission across the network 700.

The content is routed to the end users 706 via a number of routers 704. The routers 704 may be operated to execute a multicast transmission protocol. In the multicast transmission protocol, content is addressed from the source 702 to the end users 706 and transmitted substantially simultaneously to the end users 706 in a one-to-many fashion. The routers 704 may be wired and/or wireless.

In multicast systems, content is typically delivered on-demand. Thus, one or more users may request a content stream. The network operator may aggregate viewing requests to be serviced by a single multicast stream. Additional users who request the same content may be added to the stream. The network generally has certain bandwidth limitations and may specifically have a limited amount of bandwidth (at any given time) that is available for multicast use (e.g., because other bandwidth is reserved for other purposes).

Figure 8:
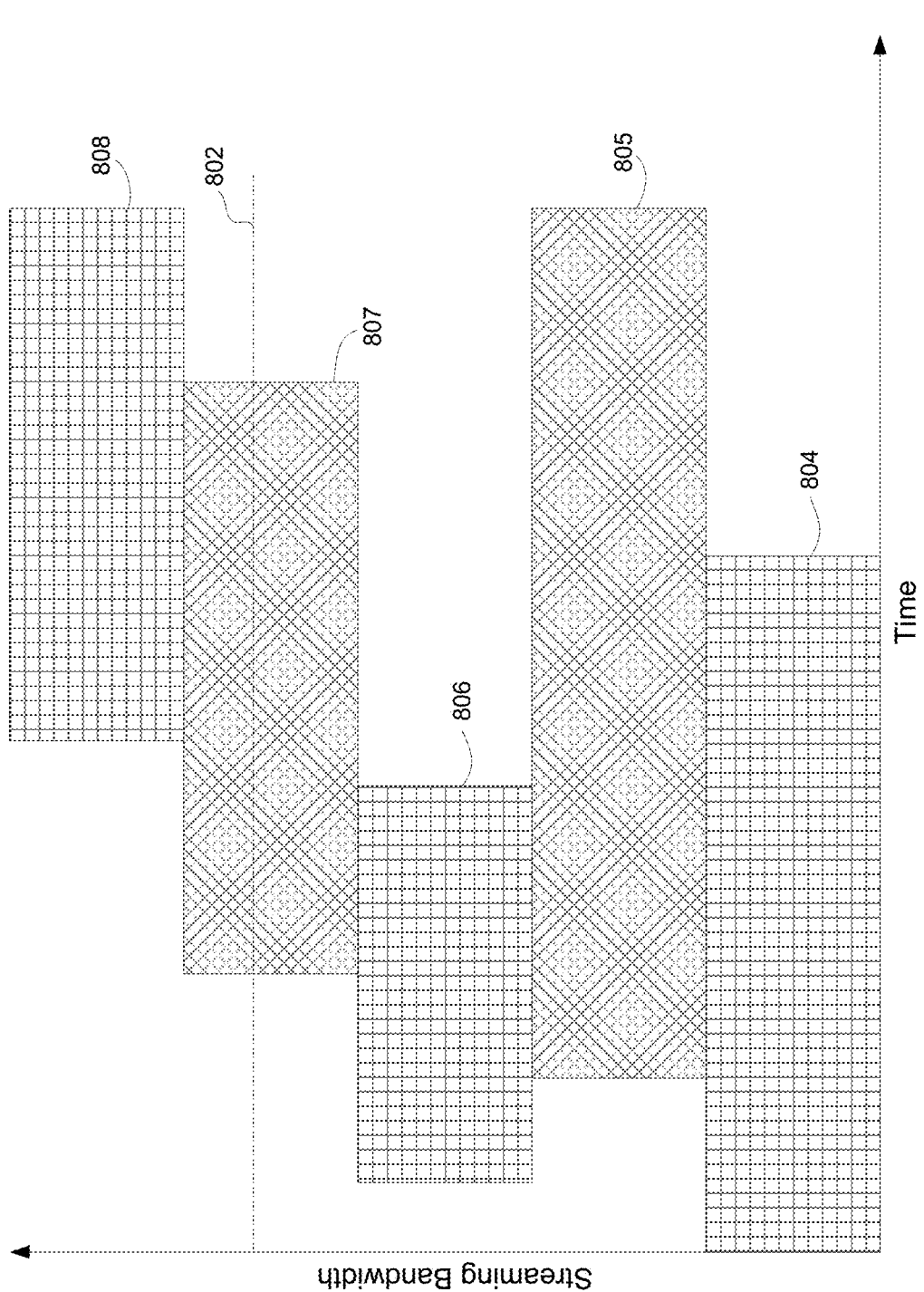
FIG. 8 illustrates content streams, of the network of FIG. 7, that may be managed in accordance with the present invention.

FIG. 8 illustrates the need for allocating resources for asset delivery in such contexts. As shown, a limited amount of bandwidth 802 may be available for asset delivery, in this case illustrated as being substantially constant over the timeframe under consideration. FIG. 8 shows examples of content streams 804-808 for which multicast transmissions may be desired. For example, each of these streams 804-808 may include a television show, live programming, movie, or the like, and may or may not include commercial breaks. The streams 804-808, or individual ads delivered within the streams 804-808 may define assets for which resources are managed in accordance with the present invention. It will be appreciated that the time at which each stream 804-808 begins and ends is uncertain as that may depend on requests from users. However, in the event that such streams overlap as shown, the streams 804-808 may require more resources than the available bandwidth 802. The resources may be allocated as described in Section 2 below.

1.4 Hybrid Systems

Figure 9:
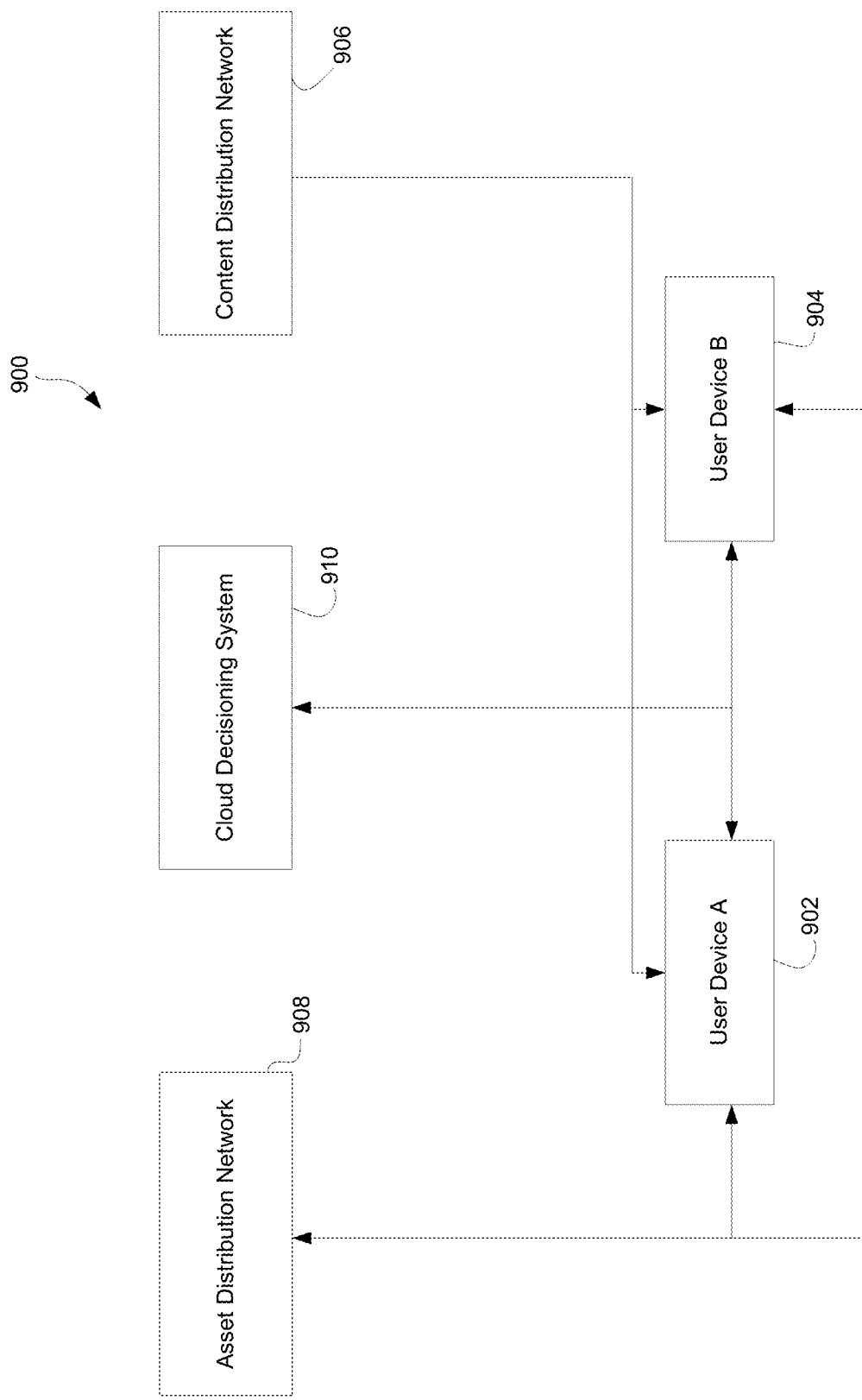
FIG. 9 is a schematic diagram of a hybrid network in connection with which the invention may be implemented.

The network environments where resource allocation can be optimized in accordance with the present invention are not limited to broadcast networks or streaming networks, but may also encompass, among other things, hybrid systems that utilize resources of different networks. An example of this is the hybrid system 900 of FIG. 9. In the illustrated system 900, UEDs 902 and 904 receive content, such as programming, inserted in a content distribution network 906 and assets, such as advertisements, inserted in an asset distribution network 908. The networks 906 and 908 may be different types of communication networks. For example, the content distribution network 906 may be a broadcast network, such as a satellite or cable television network, and the asset distribution network 908 may be a data network such as the internet.

The illustrated system 900 further includes a cloud decisioning system 910 that may be, for example, accessed via the internet. The illustrated cloud decisioning system 910 provides information to the UEDs 902 and 904 to assist in selection of assets for delivery in addressable ADOs, for example, an identification of one or more assets that are appropriate for the UED 902 or 904. More specifically, where the cloud decisioning system 910 is separate from the content distribution network 906, such a process may involve a request from one of the UEDs 902 or 904 requesting identification of assets for an upcoming ADO. For example, such a request may be prompted by messages contained in the content stream of the content distribution network 906, or sent to the UED 902 or 904 separately, indicating an upcoming ADO and possibly providing additional information concerning the ADO. In response (or ahead of time), the cloud decisioning system 910 may access information concerning a household or individual user of the UED 902 or 904, information concerning targeted audiences for various assets, information concerning cost of delivery (e.g., CPM) or campaign fulfillment (e.g., pacing, frequency, etc.), and other information to select one or more assets for the UED 902 or 904 for that ADO. The selected asset(s) are then identified in a message to the UED 902 or 904.

Transmission of assets from the asset distribution network 908 to the UEDs 902 and 904 may be effected in different ways. In one implementation, the UEDs 902 and 904 may request assets from the asset distribution network 908 upon receiving asset identifications from the cloud decisioning system 910. As the identifications are received from the cloud decisioning system 910 only a short time prior to the beginning of an ADO, it will be appreciated that this may require substantial bandwidth for asset delivery, particularly where multiple ADOs (e.g., of multiple television programming channels) occur close to the same time. Thus, resources available to support asset delivery may be intelligently allocated so that the resources are not overwhelmed.

In another implementation, assets may be downloaded from the asset distribution network 908 ahead of time and stored at the UEDs 902 and 904. However, this may implicate substantial storage requirements for assets, particularly where different asset sets are stored to support different ADOs. In any case, many UEDs may need decisions from the cloud decisioning system 910 in a short period of time immediately preceding an ADO or multiple coincident ADOs, thus straining processing resources. Accordingly, it may be important to make intelligent decisions regarding resource allocation in connection with asset distribution and delivery.

2. Resource Allocation Optimization

From the discussion above, it will be understood that resource allocation for distribution of assets is problematic in a variety of network contexts. It is generally desired to maximize some reward or benefit associated with asset delivery, in many cases by maximizing the revenues derived from asset delivery. The problems associated with optimizing resource allocation in this regard include uncertainties as to when ADOs will occur (and thus whether ADOs will overlap), uncertainties regarding the value of asset delivery, particularly in addressable asset delivery contexts, and, in some cases, uncertainty concerning what resources will be available for asset delivery.

Figure 10:
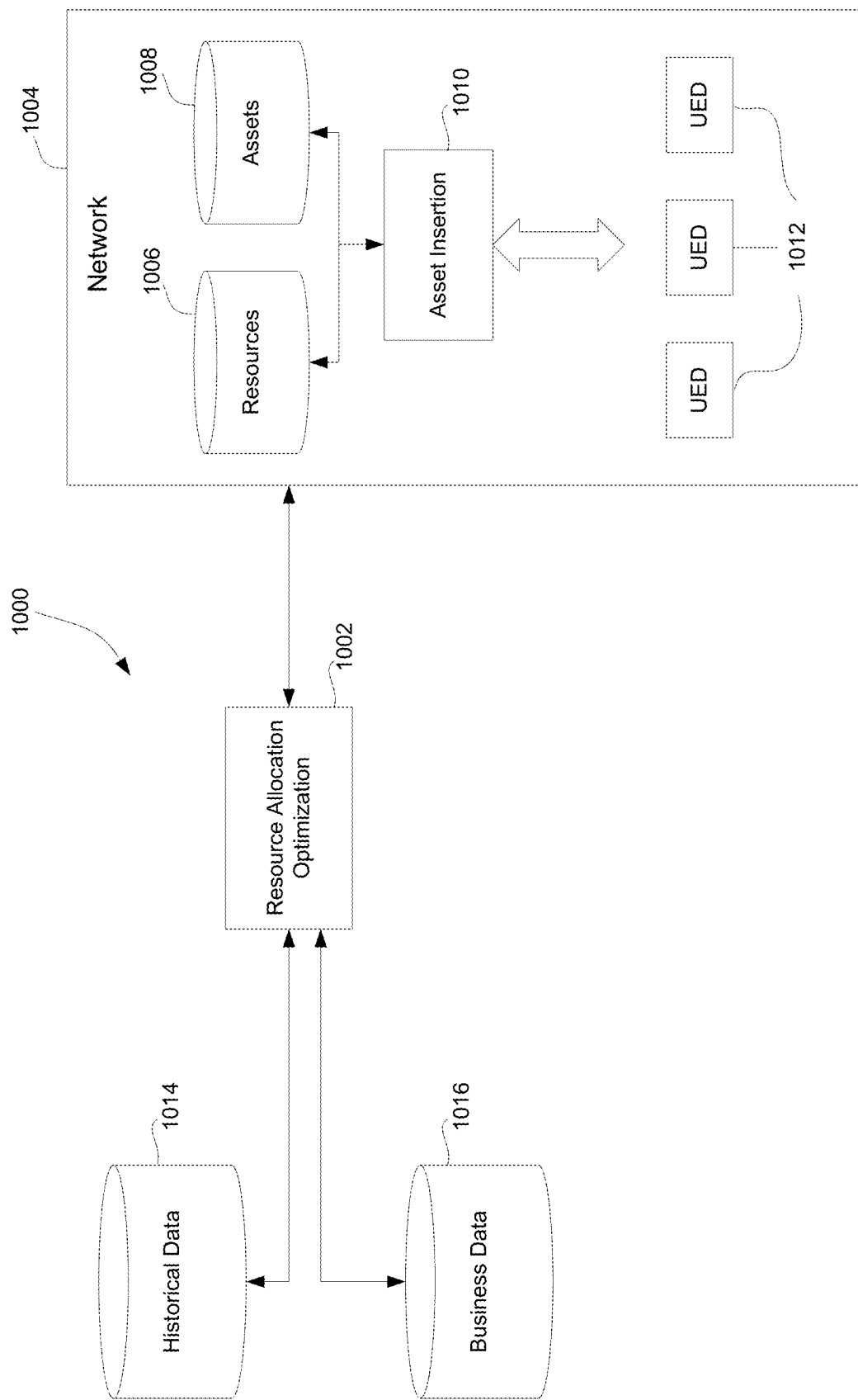
FIG. 10 is a schematic diagram of a resource allocation optimization system in accordance with the present invention.

These concerns are addressed by the resource allocation system 1000 shown in FIG. 10. The system 1000 generally includes a resource allocation optimization (RAO) platform 1002 for optimizing the allocation of resources in network 1004 for delivery of assets to UEDs 1012. As will be described in more detail below, the RAO platform 1002 determines probabilities that certain ADOs will occur within a selected time window and uses these probabilities together with information concerning values of asset delivery to determine an optimal use of asset delivery resources. In this regard, the illustrated RAO platform 1002 receives historical data from repository 1014 that facilitates calculation of probabilities that ADOs will occur. Such information may be compiled based on asset delivery records for similar network environments in the recent past or over time.

For example, in the case of broadcast television networks, asset delivery records may be obtained from a network provider or an addressable asset system provider/operator. In the latter regard, such addressable asset systems may receive reports concerning asset delivery for billing or other purposes. Among other things, such reports may identify the addressable asset that was delivered, the programming network in connection with which the asset was delivered, and the time of delivery. Such reports can be used in connection with schedule and programming information to estimate (e.g., statistically or via machine learning) when ADOs are likely to occur, or the probability of an ADO occurring during a particular time window. Such probabilities may be calculated in relation to particular programming networks, particular times/days of the week, particular programs, particular program types (e.g., live spots, television programs, movies, news, etc.), and/or state of progress of the programming.

In addition, the RAO platform 1002 may receive business data from repository 1016, e.g., for use in calculating values associated with asset delivery. Still considering the case of broadcast television networks, such business data may relate to projected audience size, audience composition, and delivery costs (e.g., CPM) for individual audience segments. Thus, in the case of addressable ADOs, the value of allocating resources to an addressable ADO may be determined by aggregating the revenues (e.g., CPM times audience segment size in thousands) derived for each audience segment serviced. The resource cost in this example (assuming a channel hopping implementation with one asset for one audience segment on each asset channel) may be one asset channel for each audience segment for the duration of the asset plus any allocated timing uncertainty. It will be appreciated that resources may be allocated for an entire ADO or for selected audience segments of an ADO (e.g., available asset channels may be split between ADOs as described above).

Thus, the business data may be obtained from network providers, ratings systems, addressable asset systems, and other sources. The information may define what share of the overall audience each segment is expected to receive and what cost an advertiser is willing to pay for each audience segment. In some cases, how an audience is best segmented may depend on how many segments can be supported by allocated resources (e.g., male and female segments may be utilized if only two asset channels are available, whereas incomes over $100,000, followed by residual males and residual female segments may be utilized if three asset channels are available). In this regard, a particular allocation may be assumed or alternative values may be determined for multiple possible resource allocations. It will be appreciated that the repositories 1014 and 1016 include any sources from which the noted information may be obtained and may encompass databases or other data resident on different platforms (e.g., computers, servers, cloud-based resources) of different entities.

The network 1004 may be any of various networks including cable television, satellite television, streaming, or hybrid networks as discussed above. The illustrated network 1004 includes a collection of assets 1008—e.g., advertisements and associated information such as targeting parameters, constraints, campaign goals, etc.—for delivery to the UEDs 1012. In addition, the network 1004 includes resource information 1006 concerning the resources that are available for asset delivery. Such resources may be defined in relation to bandwidth, asset channels, processing resources or the like and may change over time. Moreover, the resources available may be flexible depending, for example, on the value that can be obtained for delivery of assets. The illustrated network also includes asset insertion equipment 1010. The nature of this equipment 1010 varies depending on the type of network 1004 but may, for example, include headend equipment in the case of a cable network or server resources in the case of a streaming network. The functionality of the RAO platform 1002 will now be described in more detail.

For ease of illustration, the resource allocation optimization functionality is described below primarily in relation to certain new technologies for addressable asset delivery in broadcast cable television networks. It will be appreciated that the functionality is not limited to this context.

The new technologies create systems that multiplex different assets to different viewers who are watching the same programming network, by instructing the individual cable signal converter set-top boxes within each household to transparently select from the available assets those assets specifically addressed to the demographics of that household or viewer(s).

This strategy permits an aggregation model of asset delivery, improving on the conventional linear model. In aggregation, asset providers pick the people who they want to see the asset, rather than coordinating with the networks and distributors to pick ADOs in which the asset will play. The use of aggregation improves the asset delivery efficiency of ADOs, measured by the number of asset impressions (rewards) that are successfully delivered to the correct targeted audience (e.g., demographic), because ads in the linear stream that would otherwise fail to satisfy addressability requirements in some households may be replaced with alternatives that are correctly addressed. Asset providers ultimately pay per impression, so this technique provides the industry with the opportunity to increase revenues/profitability and in return allows for more broad accessibility of programming and advanced technologies.

However, this system imposes a new cost on the cable companies: the loss of some transmission bandwidth to the asset channels. In addition, the number of networks for which the addressable system is enabled may be large and due to capacity constraints, there will be only a limited number of shared resources k (often as few as four sets of three or four asset channels), to support incoming breaks. Eventually, some requests for resources will be declined. An important objective is to optimize the expected revenue which will correspond to the maximum expected number of viewers in serviced network ADOs over some period of time, assuming the same revenues per viewer.

2.1 Greedy Algorithm vs. Sadeghi Mizera (SM) Algorithm

The existing method of resource allocation is a straightforward first-come-first-serve (Greedy) algorithm, which serves networks unconditionally as they place requests until lack of resources forces denial. Such an algorithm is in general suboptimal: if the serving rewards differ and a highly lucrative network has a big probability of having an ADO in the near future, it may be more profitable to reserve the resource for it rather than serving the less rewarding ones. This Greedy algorithm is a base case, and it can be implemented and tested against recorded or synthesized break arrival data, in either a continuous-time or discrete-time version.

The description below sets forth an improved algorithm, Sadeghi Mizera (SM). The concept of the SM algorithm is that it proceeds by determining networks that have the highest expected profit values and then computes whether reserving the resources for these networks would have a higher expected value outcome than assigning through the Greedy algorithm. For simplicity in the following, it is assumed that providing any valid asset to each individual is equally valuable and employ the number of viewers of serviced ADOs as the value to maximize.

The resulting algorithm yields better results when the probabilities of break arrivals (initiation of ADOs) are known. If the probabilities are estimated by the system, experiments on real data show that the SM algorithm outperforms the Greedy algorithm at maximizing the above value.

2.2 Theoretical Result

The SM algorithm is based in part on a mathematical model developed based on experience in the field. The following assumptions are adopted in this mathematical model:

Time discretization to one minute.
Known value of each network per minute (rewards).
Probabilistic independence of break arrivals between networks.
Time dependence of probability of break arrivals within a network.

Time discretization by each minute results in localization of decisions and interactions to the individual minute. This model is fully defined by provision of the values for $P_i$ and $R_i$. $P_i$ is the probability of network i going to break, and the $R_i$ is the value of servicing network i if it goes to break, which is simplified to the number of viewers of that network for these experiments. For the discretized case, these values are given for each minute.

Moreover, in order to form an initial solution, it is assumed that the available resources are down to the last set of resources (k=1). Hence, more than one network going into break in an overlapping minute will cause conflicts in their requests for the last resource. In the mathematical model, it is assumed that the Greedy algorithm works as if resources are allocated randomly (probability of one break coming before the other one is the same as coming after). That is, if out of the n networks, the networks$\{n_1, n_2, \ldots, n_q\}, q \leq n$, go to break in an overlapping minute, then the expected profit will be $$\frac{R_1 + R_2 + \ldots + R_q}{q},$$

which is simply the mean rewards for networks in collision, since there is just one resource to support coming breaks. The SM algorithm is formulated for the case of known probabilities of break arrival per unit of time per network. In this discussion, for simplicity of illustration, rewards are considered to be delivered impressions. That is, it is assumed that every asset has the same revenues per viewer such that revenues or profits directly correspond to delivered impressions. It will be appreciated that the framework can be generalized to account for differences in this regard.

After deriving this mathematical model, the path to improved solution lies in the application of rules of probability calculus. It should be emphasized that the solution is probabilistic, i.e. superior on average; however, it is well-known in probability theory that such an average behavior results in the long run in practically sure superior behavior in practice (an application of so-called law of large numbers).

2.2.1 Basic Notation

The following notation will be used in the description below.

k Number of available resources
n Number of programming networks
$P_t=(P_{1t}, P_{2t}, P_{3t}, \ldots)$ Probabilities of networks 1, 2, 3, ... airing commercial breaks at time t
$R_t=(R_{1t}, R_{2t}, R_{3t}, \ldots)$ Number of delivered impressions (rewards) for networks 1, 2, 3, ... airing commercial breaks at time t
$G_{kt}(S,P,R)$ The expected reward of the Greedy algorithm serving k resources at time t for any subset, S, of networks
$SP_{kt}(S,P,R)$ The expected reward of the SM algorithm serving k resources at time t for any subset, S, of networks
[i ∈A] 1 if i ∈ A and 0 otherwise
|A| Cardinality of set A
$S_\ell$ The set of all subsets of S with cardinality $\ell$; $S_{|S|}=S$
$\Pi_{l=p}^{q} A_l\ A_q A_{q-1} \ldots A_p$ if $q \geq p$ or 1 if $p>q$, $\forall A_l \in R^1$ All variables are time dependent, but to ease the notation the time subscript (t) will be dropped. Hence, definitions are per minute. In addition, for any subset, S, of networks, $G_k(S)$ and $SP_k(S)$ are defined to be the expected reward of the Greedy algorithm and SM algorithm serving k resources at time t—the latter suppressed in the notation, as well as P and R.

2.2.2 Greedy Algorithm Formulation for One Resource

The expected value of the Greedy algorithm across the span of all networks has a well-defined mathematical formula.

For any subset, S, of networks, $G_1(S)$ is defined to be the expected reward of the Greedy algorithm serving 1 resource at time t (again, the latter suppressed in the notation, as well as P and R)

$$G_1(S) = \sum_{\ell=1}^{|S|} \sum_{I \in S_\ell} L_S(I) \frac{1}{\ell} \sum_{j \in I} R_j \qquad (1)$$

where, $$L_S(I) = \prod_{i \in S} P_i^{[i \in I]} (1-P_i)^{1-[i \in I]} = \prod_{i \in S \cap I} P_i \prod_{j \in S \setminus I} (1-P_j)$$

Note that the term $\ell$ reflects the number of networks going into break in an overlapping minute and $$\frac{1}{\ell}$$

accounts for the random allocation of the resource.

Furthermore, $G_1(S)$ can be rewritten just in terms of $P_i$s and $R_i$s. Assuming, $S=\{1, 2, \ldots, n\}$ and $$\max_{i=1,2,\ldots,n} P_i R_i = P_1 R_1;$$

$P_i R_i = P_1 R_1$:

$$G_1(S) = P_1 R_1 \Delta + I - P_1 II \qquad (2)$$

Where, $i_j=2,3, \ldots, k$, $1<k$ and $$\Delta = 1 + \sum_{m=1}^{n-1} \frac{(-1)^m}{m+1} \sum_{i_1<i_2<\ldots<i_m} \prod_{j=i_1}^{i_m} P_j$$

$$I = \sum_{m=1}^{n-1} \frac{(-1)^{m+1}}{m} \sum_{i_1<i_2<\ldots<i_m} \prod_{j=i_1}^{i_m} P_j \sum_{j=i_1}^{i_m} R_j$$

$$II = \sum_{m=1}^{n-1} \frac{(-1)^{m+1}}{m+1} \sum_{i_1<i_2<\ldots<i_m} \prod_{j=i_1}^{i_m} P_j \sum_{j=i_1}^{i_m} R_j$$

2.2.3 One Step SM Algorithm Formulation for One Resource

One step SM is an improved solution over the Greedy algorithm that proceeds by determining a preferred network (network with highest expected profit $P_i R_i$) and then computing whether reserving the resource would have a higher expected value outcome than assigning through the Greedy algorithm. This procedure has three steps:

(1) Calculate the Greedy expected value;
(2) Calculate max PiRi, over the span of all networks;
(3) Adopt the strategy that maximizes the expected profit.

In other words, the SM algorithm at every minute decides either to reserve the only resource for the network with highest predicted expected profit, $P_i R_i$, or to just leave it to the Greedy algorithm. The following Theorem proves that the SM algorithm is superior to the Greedy algorithm. Simulation study demonstrates that the SM algorithm outperforms the Greedy algorithm.

Theorem. Under the assumptions of known value and probability of break arrival per minute per network, independence between networks and $$\max_{i=1,2,\ldots,n} P_i R_i = P_1 R_1$$

$P_i R_i = P_1 R_1$ we have $$SP_1(S) \geq G_1(S) \quad (3)$$

where, $$SP_1(S) = \begin{cases} P_1 R_1 & P_1 > \frac{I}{II + R_1 - \Delta R_1} \\ G_1(S) & o.w. \end{cases}$$

Proof. Under the assumption $$P_1 > \frac{I}{II + R_1 - \Delta R_1} \text{ we get } P_1 II + P_1 R_1 - P_1 \Delta R_1 > I$$

which results in $P_1 R_1 > P_1 R_1 \Delta + I - P_1 II$ and equivalently $P_1 R_1 > G_1(S)$.

An illustrative example: Herein, an example to better understand the behavior of the introduced SM algorithm versus the Greedy algorithm is provided. Assuming two networks (n=2) and only one available resource (k=1), the expected profit through the Greedy algorithm would be $G_1(\{1,2\}) = P_1(1-P_2)R_1 + P_2(1-P_1)R_2 + P_1 P_2(½R_1 + ½R_2)$
Note that in the case of collision, the profit through the Greedy algorithm would be either $P_1 P_2 R_1$ or $P_1 P_2 R_2$ depending on which network goes to break first and consequently a suboptimal choice will be made in the case that network 2 goes to break first but $R_1 > R_2$. However, the SM algorithm would reserve the resource for network 1 and decline the request for resource of network 2 since $P_1 R_1 > P_2 R_2$.

2.2.4 Approximation and Quadratic Computation of Expected Greedy Solution for One Resource From equation (1), it can be seen that the expected Greedy solution for all possible subsets of breaking networks, just for a single resource, k=1, has $\Sigma_{m=1}^{|S|} \binom{|S|}{m} = 2^{|S|} - 1$ terms and the direct calculation has exponential computational complexity. Since this value is required as part of the calculation of the smart predictive algorithm, that algorithm also has exponential computational complexity. To enable practicable calculation when the number of programming networks is large, the expected Greedy solution can either be approximated, which is a tradeoff between accuracy and the complexity of calculation, or the expected Greedy calculation can be reformulated to a recursively defined process with reduced computational complexity.

2.2.4.1 Approximation of the Expected Greedy Solution for One Resource

Due to the fact that $$\sum_{i_1<i_2<\ldots<i_m} a_{i_1} a_{i_2} \ldots a_{i_m} \leq \frac{1}{m!\left(\sum_i a_i\right)^m} \text{ for } a_i \geq 0$$

we have following upper bounds for $\Delta$, $I$, and $II$ $$\Delta \leq 1 + \sum_{m=1}^{k-1} \frac{(-1)^m \left(\sum_{i=2}^k P_i\right)^m}{(m+1)!}$$

$$I \leq \sum_{i=2}^{k} P_i R_i \sum_{m=1}^{k-1} \frac{(-1)^{m+1} \left(\sum_{i=2}^k P_i\right)^{m-1}}{m!}$$

$$II \leq \sum_{i=2}^{k} P_i R_i \sum_{m=1}^{k-1} \frac{(-1)^{m+1} \left(\sum_{i=2}^k P_i\right)^{m-1}}{(m+1)(m-1)!}$$

2.2.4.2 Quadratic Computation of the Expected Greedy Solution for One Resource By using a recursive formulation, the expected value of the Greedy solution can be computed in $O(n^2)$ computational complexity. The recursion is performed on the size of the set of networks currently under consideration. Suppose there was a calculated value for expected Greedy for a set of networks $S_\alpha$. Then, if that could be used in a linear-time calculation for the value of the expected Greedy solution for the set $S_\beta = S_\alpha \cup s$ for any network s not already in $S_\alpha$, the process could recurse through the set of networks not yet included and eventually calculate the expected Greedy solution for the entire set of networks. For simplicity, the algorithm is described with the assumption that the networks are numbered $\{1, 2, \ldots, n\}$ and the process recurses by introducing the next numbered network at each step.

Let $G_1(n-1)$ be the value for the expected Greedy solution if we include only the first n−1 networks ($\{1, 2, \ldots, n-1\}$). If the network n is introduced, then either that network goes to break or it does not. If it doesn't, which has probability $1-P_n$, then the value for the expected Greedy solution in this case is the same as the previous value, which is already known to be $G_1(n-1)$. So, the process only needs to calculate the case for when the new network goes to break, which happens with probability $P_n$. Clearly, $G_1(1)=P_1R_1$, so a base case for the recursion is established.

Furthermore, the expected Greedy solution at step n depends on number of networks colliding at step n−1. To that end, let $C_n$ be the size of the set of networks in collision amongst the first n networks, and define $E_n^j$ to be the amount of rewards when j networks go to break ($C_n=j$) among the first n networks. In addition, define $B_n^j=P(C_n=j)$, $0 \le j \le n$, $n \ge 1$, where $B_n^j$ is the Poisson Binomial distribution over the break arrival probabilities $P_1, P_2, \ldots, P_n$ and which has its own quadratic time recursive computation.

Therefore, $$E_n^j = P(C_{n-1} = j \mid C_n = j)E_{n-1}^j + \qquad (4)$$
$$P(C_{n-1} = j-1 \mid C_n = j)\frac{(j-1)E_{n-1}^{j-1} + R_n}{j} =$$
$$\frac{(1-P_n)B_{n-1}^j}{B_n^j}E_{n-1}^j + \frac{P_n B_{n-1}^{j-1}}{B_n^j}\frac{(j-1)E_{n-1}^{j-1} + R_n}{j}$$

By considering $G_n^j = B_n^j E_n^j$ (with $G_n^0 = 0$), we have $$G_n^j = (1-P_n)G_{n-1}^j + P_n \frac{(j-1)G_{n-1}^{j-1} + B_{n-1}^{j-1}R_n}{j}, \, j > 0 \qquad (5)$$

and finally $$G_1(n) = \sum_{j=0}^{n} G_n^j$$

The recursive calculation of the Poisson Binomial $B_n^j$ is:

$$B_n^j = (1-P_n)B_{n-1}^j + P_n B_{n-1}^{j-1} \qquad (6)$$
$$\begin{cases} G_n^j, B_n^j \ \forall \, n < j = 0. \text{ Also, } B_0^0 = 1 \\ G_0^1, B_0^1 \end{cases}$$

Note that

2.2.5 Formulation of the Greedy Algorithm for an Arbitrary Number of Resources For any subset, S, of networks, define $G_k(S)$ to be the expected reward of the Greedy algorithm serving k resources at time t.

$$G_k(S) = \sum_{I \in S_\ell, \ell \le k} L_S(I) \sum_{j \in I} R_j + \sum_{I \in S_{k+1}} L_S(I) \frac{1}{\binom{k+1}{k}} \sum_{J \in I_k} \sum_{j \in J} R_j +$$
$$\sum_{I \in S_{k+2}} L_S(I) \frac{1}{\binom{k+2}{k}} \sum_{J \in I_k} \sum_{j \in J} R_j + \ldots + \sum_{I \in S_{|S|}} L_S(I) \frac{1}{\binom{|S|}{k}} \sum_{J \in I_k} \sum_{j \in J} R_j$$

It is clear that the computational complexity of direct calculation of the Greedy expected value also increases exponentially in the number of programming networks |S| when there is more than one resource k.

2.2.5.1 Quadratic Computation of the Expected Greedy Solution for an Arbitrary Number of Resources Here the recursive formula is generalized for calculation of the expected Greedy solution for any subset of networks and an arbitrary number of resources k. Considering, $B_n^j$: probability of j networks go to break out of n, $E_n^j$: profit when j networks break out of n and $G_n^j$: expected profit when j networks break out of n, we have $$G_n^j = \begin{cases} (1-P_n)G_{n-1}^j + P_n(G_{n-1}^{j-1} + B_{n-1}^{j-1}R_n) & j \le k \\ (1-P_n)G_{n-1}^j + P_n \frac{(j-1)G_{n-1}^{j-1} + kB_{n-1}^{j-1}R_n}{j} & j \le k \end{cases} \qquad (7)$$

and finally $$G_k(n) = \sum_{j=0}^{n} B_n^j E_n^j = \sum_{j=0}^{n} G_n^j$$

2.2.6 One Step and Multi-step SM Algorithm Formulation for an Arbitrary Number of Resource The SM algorithm can be generalized to accommodate more than one resource available at a time for any subset, $S=\{1, 2, \ldots, n\}$, of networks and is called "one step SM algorithm." For instance, in case of two resources at each minute, $k=2$, and under the condition $P_1R_1 > P_2R_2 > \ldots > P_nR_n$, here are the possible strategies:

(1) Do the Greedy algorithm on both resources, so the expected reward would be $G_2(S)$;
(2) Reserve one resource and do the Greedy algorithm on the second one, which will result in expected reward of $$\max_{i=1,2,\ldots,n} (P_i R_i + G_1(S \backslash i));$$

$(P_iR_i+G_1(S \backslash i));$ (3) Reserve both resources and get $P_1R_1+P_2R_2$ as expected reward.

The chosen strategy will be the one maximizing overall expected profit at that minute:
max $(G_2(S),$ $$\max\left(G_2(S), \max_{i=1,2,\ldots,n} (P_i R_i + G_1(S \backslash i)), P_1R_1 + P_2R_2\right)$$

$(P_iR_i+G_1(S \backslash i)),$ $P_1R_1+P_2R_2)$

Simulation in the next section demonstrates that this algorithm is superior to the Greedy algorithm. Furthermore, the efficiency of this algorithm can be improved by including a mixed strategy called "multi-step SM algorithm."

The idea behind this mixed strategy is straightforward. Similar to the one step SM algorithm it still has three possible strategies:
(1) Do the Greedy algorithm on both resources;
(2) Reserve one resource and do the Greedy algorithm on the second one;
(3) Reserve both resources.

However, the way resources are reserved will be updated. Here are the expected profit based on each potential decision:

$$EP1 = G_2 S \qquad (1)$$

$$EP2 = \begin{cases} \max_{i=1,2,\ldots,n} (P_i R_i + G_1(S\backslash i)) \\ \text{or} \\ \max_{i,j=1,2,\ldots,n, i<j} (G_1(\{i,j\}) + G_1(S\backslash\{i,j\})) \end{cases} \qquad (2)$$

$$EP3 = \begin{cases} P_1 R_1 + P_2 R_2 \\ \text{or} \\ \max_{i,j,m,l=1,2,\ldots,n, i<j<m<l} (G_2(\{i,j,m,l\})) \end{cases} \qquad (3)$$

Where $$G_1(\{i,j\}) = P_i(1-P_j)R_i + P_j(1-P_i)R_j + \frac{P_i P_j}{2}(R_i + R_j).$$

Finally, the chosen strategy will be the one maximizing overall expected profit at that minute:

max (EP1, EP2, EP3)

Notice that in part (2) instead of reserving just for the network with highest $P_i R_i + G_1(S\backslash i)$, there is the option to reserve for the first two networks with highest $G_1(\{i,j\}) + G_1(S\backslash\{i,j\})$ and then do the Greedy algorithm between them. In the same way, in part (3) there is the option to either reserve both resources for the two highest networks with highest expected profit or reserve for the first four highest networks and then do the Greedy algorithm between them.

In the case k=1, multi-step allows for reserving for the two networks with highest expected profits and doing Greedy between them as well as reserving the single resource for the first network with highest expected profit. An implementation may perform the optimization on more than one resource.

2.3 Method Evaluation

In this section, the methods are evaluated using historical data. To provide a fair assessment, the proposed algorithm is applied such that it does not know about the future but just the past, thereby simulating the real setting in which the algorithm runs. The optimal algorithm is formulated for the case of known probabilities of break arrival per unit of time per network, however, these probabilities are not known but are instead estimated. Hence, the foundation of forming an effective algorithm is in estimating the probability of break arrivals per unit of time per network accurately which requires constructing effective statistical/stochastic models for break placements for each network. It is important to notice that the aim is to create a model of the process as a sequence of conditional density function for any given value. In other words, the process is not directed to point prediction of when the next break happens, but instead the whole distribution of next break arrival. The process is concerned with probability forecasts, so the prediction is a probability, the probability of break arrival in the next minute. There are various methods for probability distribution estimation, like Ensembles of Mixture Density Networks, but what is considered in the following experiments for obtaining probabilities are based on a sequence of conditional density functions for any given interval between breaks, by combining kernel and nearest-neighbor methodology while gaining some strength due to empirical Bayes characteristics. Due to the time dependency of break arrivals, probabilities are estimated dynamically from historical data. The data set is divided into training and testing sets to ensure realistic simulations. The training set is used to estimate the probability distribution of next break arrivals, from which the probability is estimated of networks going to break within the next minute given there was no break to this time (the hazard function). The testing set is used for evaluation of the methodology. Estimated probabilities from the data and the known reward associated with each network per minute are applied to simulate the decision procedure within the SM algorithm.

2.4 The Data Setting

Here, the historical break data (generally corresponding to ADOs) from the San Francisco area over eighty-three days (Aug. 1-Oct. 22, 2007) combined with viewership data from San Francisco are used for the experiment. The data is divided into the first 61 days which is used for estimation of the probability distribution of the intervals between breaks, and last 22 days that are used for evaluation of the methodology.

A break data contains the actual ad break times (in hours, minutes and seconds) and durations for a particular network on a particular day along with network ID. So, the waiting time between each two breaks can be calculated. Viewership data is represented as a tabulation of viewing by households of television stations and cable programming available in the region by fifteen minute period. The assumption here is that the number of viewers is fixed within each fifteen minutes. So, the value of each break might be evaluated through combining break data and the viewership data. In total, the break data and viewing data of 27 networks are matched.

The performance of the Greedy algorithm versus the SM algorithm (one step and multi-step) based on the approximation and quadratic recursive methods with one and two resources are compared.

TABLE 1

SM Algorithm vs Greedy Algorithm Performance for k = 1

| | Greedy | SP-A | SP-One | SP-Multi | Max | Collision |
|---|---|---|---|---|---|---|
| Expected Profit | 65,234,469 | 66,671,599 | 66,746,608 | 70,419,812 | 9 | 7,822 |
| Gain over Greedy | | 2.203% | 2.31801% | 7.94878% | | |

From Table 1, the summation of delivered impressions over the 22 days for the Greedy algorithm is 65,234,469 million. Using approximation techniques, the amount of delivered impressions through the SM algorithm is 66,671,599 million, which is very close to the 66,746,608 million calculated based on exact method (quadratic recursive). This shows that the approximation bound is very tight and accurate. In addition, it has the advantage of being fast in terms of computation. Multi-step SM algorithm delivered 70,419,812 million impressions. These results are consistent with the theory, $SP_1(S) \geq G_1(S)$. In terms of improvement, the SM algorithm using the multi-step methodology exhibits the most improvement over the Greedy algorithm (7.94878%) which results in 5,185,343 million more impression deliveries.

Over all of the considered minutes in 22 days, there were 7,822 cases where more than one network asked for resource in an overlapping minute and the maximum number of networks going into break around the same time was 9 networks.

Table 2 summarizes the results of the resource allocation problem considering all 27 networks and two resources available per minute.

TABLE 2

SM Algorithm vs Greedy Algorithm Performance for k = 2

| | Greedy | SP-One | SP-Multi | Max | Collision |
|---|---|---|---|---|---|
| Expected Profit | 94,88,7104 | 95,544,386 | 96,393,755 | 9 | 3,035 |
| Gain over Greedy | | 0.6926994% | 1.587836% | | |

It is important to notice that actually four resources (asset channels) are actually being considered, two for even minutes and two for odd minutes. The SM algorithm using the multi-step method exhibits the most improvement over the Greedy algorithm which results in 1,506,651 million more impressions delivered which is equivalent to a 1.5% improvement. Note that in these particular tests, in the case of k>1 there is not much of an improvement over the Greedy algorithm, since for most of the minutes there are enough resources to support the incoming break. The SM algorithm is the most useful when there are collisions.

In tests with more networks competing in the system, it is expected that SM provides substantial benefits in k>1 cases.

Over the whole considered minutes in 22 days, there were 3,035 cases where more than two networks asked for resource in an overlapping minute and the maximum number of networks going into break around the same time was 9 networks.

In addition, assuming that Greedy is an instant algorithm in terms of the execution time, following is the summary of execution time of the SM algorithm under different strategies over 27 networks and 22 days of testing data. The scripts are written in the R language, without optimization.

TABLE 3

Execution time of each step of SM under different strategies (in seconds)

| | Min | Median | Mean | Max |
|---|---|---|---|---|
| SP-A, k = 1 | 0.00 | 0.00 | 0.0012 | 0.13 |
| SP-One, k = 1 | 0.00 | 0.02 | 0.0149 | 0.31 |
| SP-Multi, k = 1 | 0.00 | 0.03 | 0.026 | 0.38 |
| SP-One, k = 2 | 0.01 | 0.05 | 0.0582 | 0.39 |
| SP-Multi, k = 2 | 0.04 | 0.08 | 0.0828 | 0.63 |

The approximation method to evaluate the SM algorithm is the fastest, followed by one step and multi-step for k=1. In the case of two resources available, k=2, it is obvious that the multi-step takes more execution time but the gained profit over the one step is more significant. In addition, the amount of processing time required in all cases is well within the computational capabilities of live systems.

2.5 Conclusion

The efficacy of the new probabilistic algorithm for resource allocation in networks has been demonstrated for the exemplary context of addressable advertising in traditional TV networks with application in Mobile TV networks. Its $O(n^2)$ implementation together with an approximate and exact recursive solutions have also been developed. The performance of the proposed methods were assessed on real historical data from the TV industry which resulted in significant improvement in terms of advertising over the current method in use in the industry. In fact, the multi-step SM algorithm improved the revenue by 7.94878% in case of single resource (k=1) and increased the profitability by 1.5% in the case of k=2. In addition, the processing times for all proposed methods are assessed and are well within the computational capabilities of live systems. It is noted that transmitting addressable advertising over a mobile TV platform via LTE broadcast has relevant structural similarities to delivering this advertising over traditional television systems, and so it is expected that these results from the one area transfer to the other.

Figure 11:
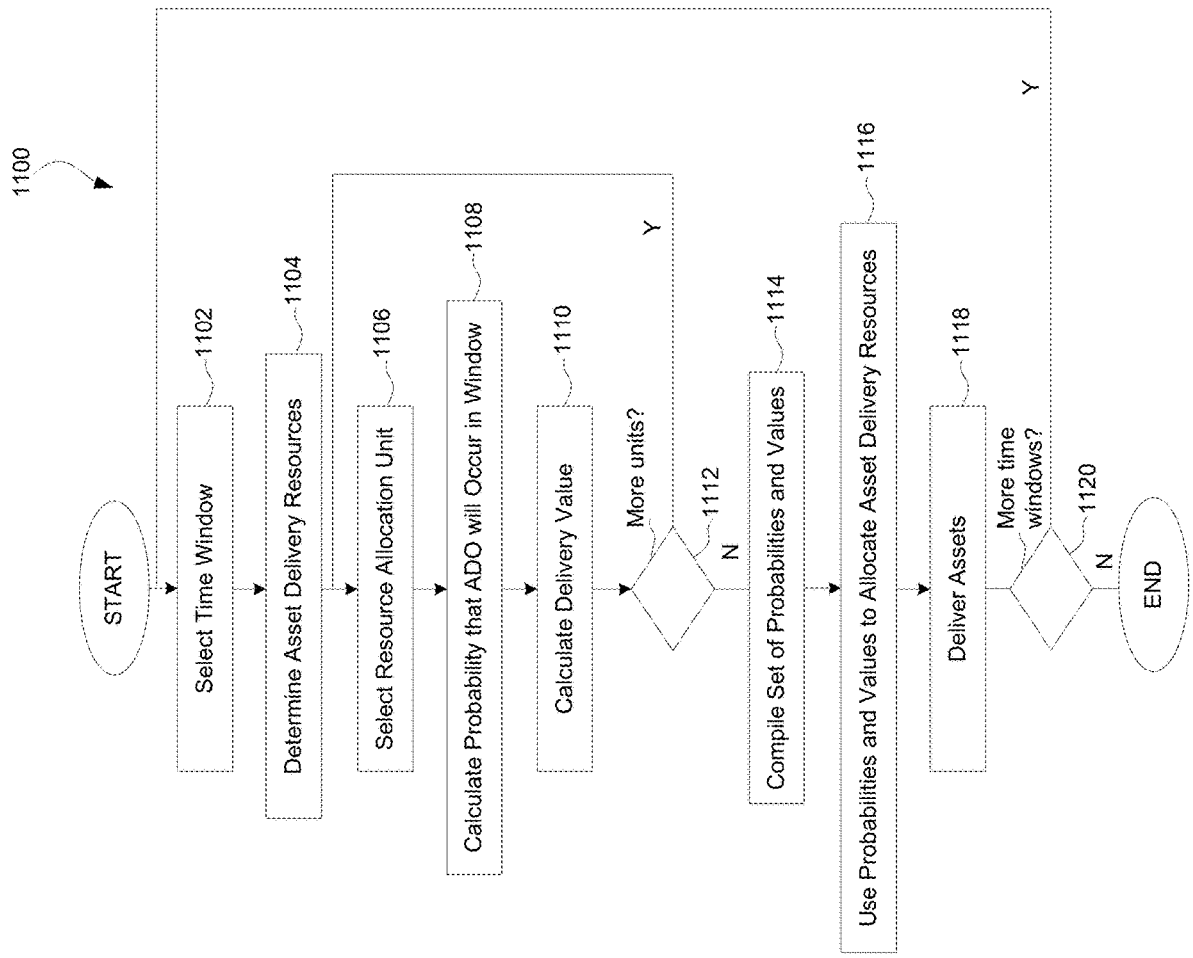
FIG. 11 is a flowchart illustrating a resource allocation optimization process in accordance with the present invention.

While a specific example has been provided above in the context of the addressable asset delivery in a cable television network, the resource allocation optimization process can be more generally summarized by reference to the flowchart of FIG. 11. It will be appreciated that steps may be added or omitted and the sequence of steps may be changed. The process 1100 involves selecting (1102) a time window, or window size for analysis of successive time windows. Selecting a practical time window will depend on the network environment. For example, optimizing resources for delivery of multicast streams may utilize a different size of time windows than addressable assets for insertion in broadcast television networks. As noted above, the time windows may be selected based on the experience of experts in a field. Optimal windows may also be determined empirically over time or by employing machine learning.

The illustrated process further involves determining (1104) the resources that are available for asset delivery. In many cases, this will be a function of bandwidth, though storage or processing resources may also be considered. Bandwidth resources may be dedicated resources for asset delivery or general resources, and may be provided in defined bands (e.g., asset channels) or undifferentiated. Moreover, the amount of resources available for asset delivery may change over time. For example, additional asset channels may be opportunistically available or additional streaming bandwidth may be made available for multicasting during periods of lower traffic.

While the time window and asset delivery resources define boundaries for allocation optimization, the process further involves some unit related to asset delivery that can be used to iterate towards a solution. Thus, the illustrated process 1100 involves selecting (1106) a resource allocation unit. This will depend on the network environment. In the case of broadcast television networks, such a unit may be a programming channel, an ADO, or a portion of an ADO such as an audience segment or segments. In streaming contexts, it may involve a stream or portion of a stream such as an ADO embedded in a stream.

The process 1100 then proceeds to calculate (1108) the probability that an ADO will occur within a window under consideration and calculate (1110) a delivery value for asset. Probabilities may be calculated based on historical data for ADOs that are deemed to be similar in some respect (e.g., same time or day of the week, same television program or type of program, same programming channel, etc.). It will be appreciated that historical data may be processed to account for changes or trends, or machine learning may be employed to estimate probabilities based on training data or otherwise. Delivery values may be based on any appropriate parameters for the network environment such as audience size and composition. Again, historical data may be used intelligently to estimate values for upcoming ADOs, including accounting for changes and trends. This may be repeated (1112) for the full set of resource allocation units. The result of these steps may include compiling (1114) a set of probabilities and associated values.

The probabilities and values can then be used (1116) to allocate asset delivery resources. In many cases, this will involve foregoing use of resources for an earlier ensuring ADO to support a later expected opportunity. For example, this may occur if the earlier opportunity has a lower asset delivery value than the later expected ADO, and the later expected ADO has a probability sufficient to warrant deferring use of the resources. Various strategies can be employed in this regard, including strategies that involve consideration of the difference in delivery values of the ADOs as well as the probability. Once the asset delivery values have thus been allocated, the assets can be delivered (1118), e.g., inserted into the network, distributed to the UED, and delivered to the user via the UED. This process can then be repeated (1120) for additional time windows.

The foregoing description of the present invention has been presented for the purpose of illustration and description. Furthermore, the description is not intended to limit the invention to the form disclosed herein. Consequently, variations and modifications commensurate with the above teachings, and skill and knowledge of the relevant art are within the scope of the present invention. The embodiments described herein above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention claimed is:

1. A method for use in allocating asset delivery resources in a communications network, comprising:
   A. operating a processing platform for:
      a. obtaining information regarding asset delivery resources available for delivering assets;
      b. determining an allocation of said set of asset delivery resources, said allocation indicating specific asset delivery opportunities (ADOs) for delivery of selected assets supported by said set of asset delivery resources, wherein at least one, earlier occurring, first ADO is rejected for use of an available subset of some or all of said set of asset delivery resources in favor of a potentially later occurring second ADO due to a determined probability that use of said available subset to support said first ADO would interfere with use of said available subset to support said second ADO; and
   B. operating a network platform of said communications network for:
      1) receiving said allocation from said processing platform; and
      2) controlling delivery of said selected assets by managing use of said set of asset delivery resources in accordance with said allocation.

2. The method of claim 1, wherein said communications network is a broadcast network comprising programming bandwidth segments.

3. The method of claim 2, wherein said asset delivery resources comprise asset bandwidth segments designated for delivery of assets.

4. The method of claim 1, wherein said asset delivery resources comprise content delivery bands of said communications network, where each of said content delivery bands supports one or more ADOs each having a temporal extent.

5. The method of claim 4, wherein said first ADO is associated with a first one of said content delivery bands and said second ADO is associated with a second one of said content delivery bands different than said first one of said content delivery bands.

6. The method of claim 4, wherein a full schedule of ADOs for said set of content delivery bands is not available for determining said resource allocation at a time sufficient to make a first decision concerning allocating a first subset of said set of resources with respect to said time window.

7. The method of claim 4, wherein said providing an allocation comprises obtaining historical data concerning the occurrence of ADOs for at least one content delivery band of said set of content delivery bands.

8. The method of claim 1, wherein said providing an allocation comprises obtaining information regarding at least one of 1) an audience size, and 2) revenues as a function of audience size for said first asset.

9. The method of claim 1, wherein said asset delivery resources are determined in relation to a defined time window.

10. The method of claim 9, wherein said communications network comprises a data network configured for streaming audiovisual content.

11. The method of claim 10, wherein said asset delivery resources comprise bandwidth of said data network available for streaming said audiovisual content.

12. A system for use in allocating asset delivery resources in a communications network, comprising:
   A. a processing platform for:
      c. determining a set of asset delivery resources available for delivering assets;
      d. providing an allocation of said set of asset delivery resources, said allocation indicating specific asset delivery opportunities (ADOs) for delivery of selected assets supported by said set of asset delivery resources, wherein at least one, earlier occurring, first ADO is rejected for use of an available subset of some or all of said set of asset delivery resources in favor of a potentially later occurring second ADO due to a determined probability that use of said available subset to support said first ADO would interfere with use of said available subset to support said second ADO; and
   B. a network platform of said communications network for:
      1) receiving said allocation from said processing platform; and
      2) controlling delivery of said selected assets by managing use of said set of asset delivery resources in accordance with said allocation.

13. The system of claim 12, wherein said communications network is a broadcast network comprising programming bandwidth segments.

14. The system of claim 13, wherein said asset delivery resources comprise asset bandwidth segments designated for delivery of assets.

15. The system of claim 12, wherein said asset delivery resources comprise content delivery bands of said communications network, where each of said content delivery bands supports one or more ADOs each having a temporal extent.

16. The system of claim 12, wherein said first ADO is associated with a first one of said content delivery bands and said second ADO is associated with a second one of said content delivery bands different than said first one of said content delivery bands.

17. The system of claim 12, wherein a full schedule of ADOs for said set of content delivery bands is not available for determining said resource allocation at a time sufficient to make a first decision concerning allocating a first subset of said set of resources with respect to said time window.

18. The system of claim 12, wherein said providing an allocation comprises obtaining historical data concerning the occurrence of ADOs for at least one content delivery band of said set of content delivery bands.

19. The system of claim 12, wherein said providing an allocation comprises obtaining information regarding at least one of 1) an audience size, and 2) revenues as a function of audience size for said first asset.

20. The system of claim 12, wherein said asset delivery resources are determined in relation to a defined time window.

21. The system of claim 20, wherein said communications network comprises a data network configured for streaming audiovisual content.

22. The system of claim 21, wherein said asset delivery resources comprise bandwidth of said data network available for streaming said audiovisual content.

* * * * *